United States Patent
Mitsunaga

(10) Patent No.: US 10,759,091 B2
(45) Date of Patent: Sep. 1, 2020

(54) FIBER-REINFORCED RESIN SHAPED PRODUCT HAVING GRAINS ON AT LEAST PART OF SURFACE THEREOF AND METHOD FOR PRODUCING SAME

(71) Applicant: Teijin Limited, Osaka-Shi, Osaka (JP)

(72) Inventor: Masaki Mitsunaga, Osaka (JP)

(73) Assignee: Teijin Limited, Osaka-Shi, Osaka (JP)

( * ) Notice: Subject to any disclaimer, the term of this patent is extended or adjusted under 35 U.S.C. 154(b) by 175 days.

(21) Appl. No.: 16/068,433

(22) PCT Filed: Jan. 5, 2017

(86) PCT No.: PCT/JP2017/000903
§ 371 (c)(1),
(2) Date: Jul. 6, 2018

(87) PCT Pub. No.: WO2017/119516
PCT Pub. Date: Jul. 13, 2017

(65) Prior Publication Data
US 2019/0009437 A1    Jan. 10, 2019

(30) Foreign Application Priority Data
Jan. 7, 2016   (JP) ................................. 2016-001825

(51) Int. Cl.
| | | |
|---|---|---|
| B29C 33/42 | (2006.01) | |
| B29C 41/38 | (2006.01) | |
| B29C 33/38 | (2006.01) | |
| B29C 59/02 | (2006.01) | |
| B29C 43/36 | (2006.01) | |
| B29C 43/18 | (2006.01) | |
| B29C 45/00 | (2006.01) | |
| B29C 70/46 | (2006.01) | |
| C08J 5/00 | (2006.01) | |
| B29K 105/12 | (2006.01) | |

(52) U.S. Cl.
CPC ............ *B29C 33/424* (2013.01); *B29C 33/38* (2013.01); *B29C 41/38* (2013.01); *B29C 43/18* (2013.01); *B29C 43/36* (2013.01); *B29C 45/0005* (2013.01); *B29C 59/02* (2013.01); *B29C 70/46* (2013.01); *C08J 5/005* (2013.01); *B29K 2105/12* (2013.01); *B29K 2995/0018* (2013.01); *C08J 2369/00* (2013.01); *C08J 2377/02* (2013.01)

(58) Field of Classification Search
CPC ..................................................... B29C 33/424
See application file for complete search history.

(56) References Cited

U.S. PATENT DOCUMENTS

| | | |
|---|---|---|
| 6,534,583 B1 | 3/2003 | Tamura et al. |
| 2013/0141792 A1 | 6/2013 | Ueda et al. |
| 2014/0134378 A1 | 5/2014 | Downs et al. |
| 2014/0186584 A1 | 7/2014 | Arakawa et al. |
| 2018/0043669 A1 | 2/2018 | Iriyama et al. |

FOREIGN PATENT DOCUMENTS

| | | | |
|---|---|---|---|
| JP | 08155966 A | * 6/1996 | ............. B29C 33/42 |
| JP | H08-187732 A | 7/1996 | |
| JP | H11-179736 A | 7/1999 | |
| JP | 2004-042413 A | 2/2004 | |
| JP | 2004-136476 A | 5/2004 | |
| JP | 2013-144447 A | 7/2013 | |
| JP | 2015-205505 A | 11/2015 | |
| WO | 2013-035705 A1 | 3/2013 | |

OTHER PUBLICATIONS

Machine translation of JP 08-155966 A, published Jun. 18, 1996. (Year: 1996).*
Mar. 28, 2017—(PCT/JP) Written Opinion of the International Searching Authority—App 2017/000903—Eng Tran.
Mar. 28, 2017—International Search Report—Intl App PCT/JP2017/000903.
Nov. 27, 2018—(EP) Office Action—App 17736053.4.

* cited by examiner

*Primary Examiner* — Vickey Nerangis
(74) *Attorney, Agent, or Firm* — Banner & Witcoff, Ltd.

(57) ABSTRACT

Provided is a fiber-reinforced resin shaped product including reinforcing fibers and a thermoplastic resin and having grains on at least a part of a surface thereof. The ratio of a maximum reflectance (R) to a half-value width (H), each of which is obtained by goniophotometric measurement satisfies Expression (1): $R/H \leq 0.034 \times R - 0.15$ (1). In the expression, R is a maximum reflectance (%), and H is a half-value width (degree).

7 Claims, 8 Drawing Sheets

PHOTOGRAPHED FROM ABOVE

PHOTOGRAPHED OBLIQUELY

FIG.2A
PHOTOGRAPHED FROM ABOVE
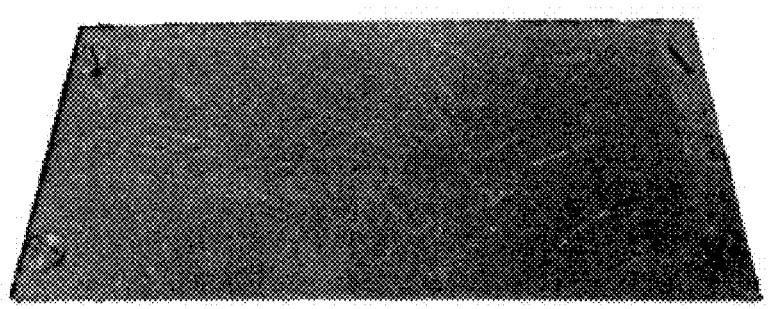
FIG.2B
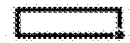
PHOTOGRAPHED OBLIQUELY

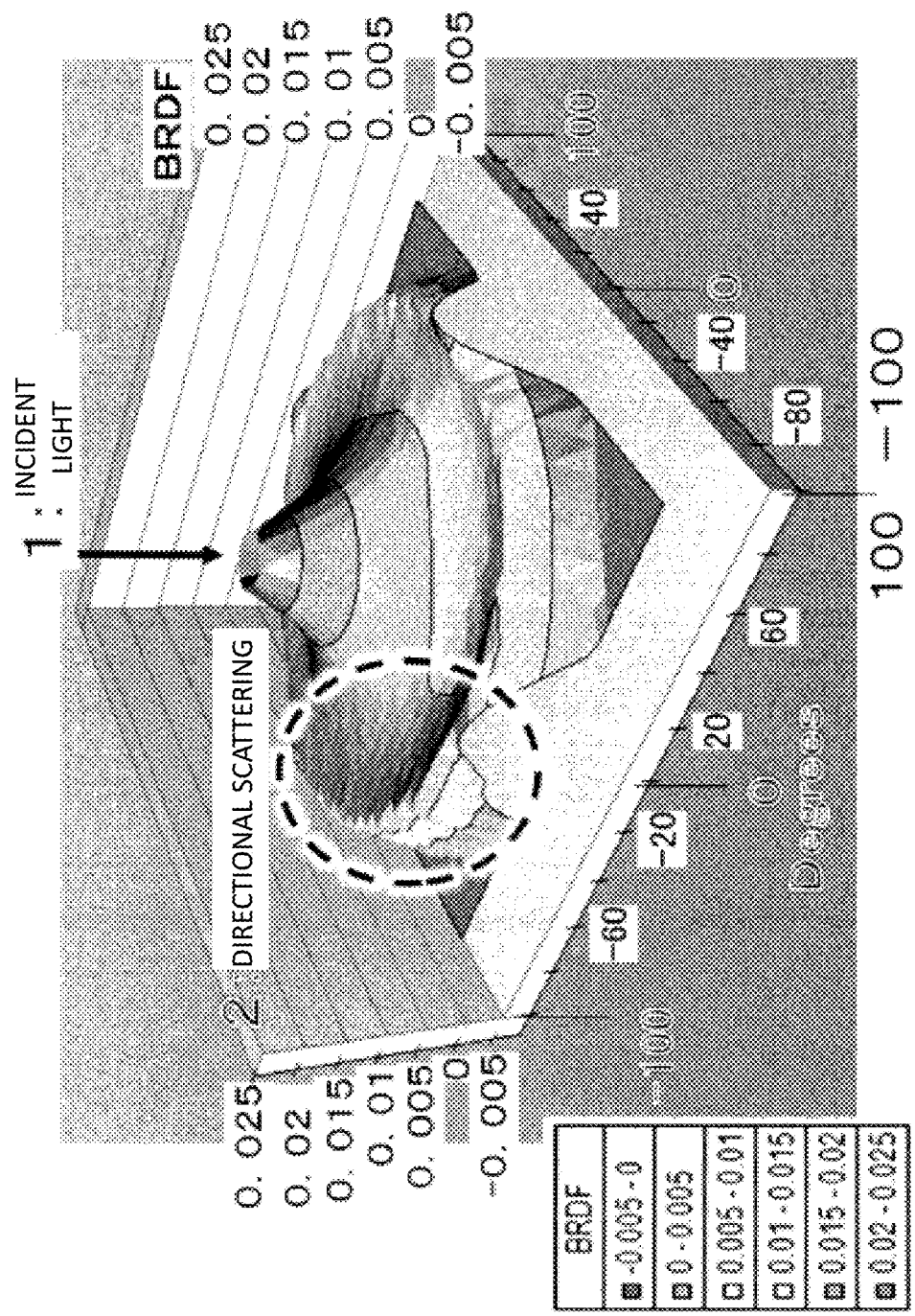

FIBER-REINFORCED RESIN SHAPED PRODUCT HAVING GRAINS ON AT LEAST PART OF SURFACE THEREOF AND METHOD FOR PRODUCING SAME

TECHNICAL FIELD

The present invention relates to a fiber-reinforced resin shaped product containing reinforcing fibers and a thermoplastic resin, having grains on at least a part of a surface thereof, and having an optically uniform and good appearance, and a method for producing the same. More specifically, the present invention relates to a fiber-reinforced resin shaped product having grains and having a good appearance which is optically uniform and does not show whitening as viewed from any angle.

BACKGROUND ART

In recent years, in the mechanical field, so-called fiber-reinforced resin materials containing a matrix resin and reinforcing fibers such as carbon fibers have attracted attention. Due to the fact that the fibers are dispersed in the matrix resin, these fiber-reinforced resin materials are excellent in tensile modulus, tensile strength, impact resistance, and the like, and thus have been studied for structural members of automobiles and the like. Among these, fiber-reinforced resin materials in which the matrix resin is a thermoplastic resin, that is, fiber-reinforced thermoplastic resin materials are excellent in mass productivity such as in molding as compared with fiber-reinforced resin materials with a thermosetting resin, and therefore, have been studied in many fields. In addition, the fiber-reinforced thermoplastic resin materials are molded into a desired shape with high productivity by various molding methods such as injection molding and compression molding, and therefore, are suitable for a wide range of applications from large parts to small parts. In particular, a fiber-reinforced resin shaped product containing reinforcing fibers and a thermoplastic resin as a matrix and having grains on at least a part of a surface thereof (hereinafter abbreviated as a shaped product with grains in some cases) has an excellent surface appearance which gives a high-class feeling, and is suitable for use on an exterior part of a product.

For example, PTL 1 discloses a fiber-reinforced resin shaped product having grains on a surface thereof, having a high surface appearance, and having an excellent strength caused by containing reinforcing fibers having a relatively long fiber length, and a method for producing the shaped product with high productivity by compression-molding a fiber-reinforced thermoplastic resin material.

Among the fiber-reinforced thermoplastic resin materials, crystalline resins exhibit high heat resistance, good chemical resistance, and high fluidity due to crystallinity as compared with amorphous resins. Thus, the crystalline resins have been widely adopted for large parts or thin parts which require these properties. In particular, in a case of compression-molding a fiber-reinforced crystalline resin material whose matrix is a crystalline thermoplastic resin, a processing temperature may be set near a crystallization temperature to maximize crystallinity of the resin. The crystallization temperature is a temperature equal to or higher than a glass transition temperature. In a case of compression-molding the fiber-reinforced crystalline resin material at such a temperature, although also affected by fluidity or molding shrinkage rate thereof, since a transfer property of a grained shape from a mold having the grained shape (hereinafter, in a case of a grained shape part, strictly, may be also abbreviated as a grained shape) is significantly improved, a surface of the fiber-reinforced crystalline resin shaped product having grains on at least a part of a surface thereof sticks to a surface of the mold, and there are some cases where a shaped product with grains and having an optically uniform and good appearance, is not obtained.

Further, recently, a production method which includes compression-molding a fiber-reinforced amorphous resin material, in which an amorphous thermoplastic resin is used as a matrix, using a mold having a grained shape and temperature-controlled to a processing temperature equal to or higher than a glass transition temperature of the amorphous thermoplastic resin, cooling the mold to a temperature equal to or lower than the glass transition temperature with the mold closed, and then releasing a shaped product with grains from the mold, namely, a so-called heat-and-cool compression molding has been used. In that case, since a transfer property of a grained shape from the mold having the grained shape is significantly improved, for the reason as described above, there are some cases where a shaped product with grains and having an optically uniform and good appearance, is not obtained.

As described above, there remains a problem in obtaining a fiber-reinforced thermoplastic resin shaped product having an optically uniform and good appearance and having grains on at least a part of a surface thereof.

As a measure for obtaining a uniform and good appearance with grains, a method of using an inorganic reinforced polyamide resin composition formed of, for example, a polycapramide resin, a polyamide resin other than the polycapramide resin, and an inorganic reinforcing material has been proposed (see PTL 2). However, this technique is a technology of blending a different type of polyamide resin into the polycapramide resin so that transfer property of grains from a mold to a shaped product during molding becomes uniform, and it is hard to say that a case where a transfer property of the entire composition is increased is considered. In addition, a method of obtaining a thermosetting resin shaped product that can be compression-molded with good releasability and has a glossy surface according to specifications has been proposed, in which, after engraving a cavity with a desired product shape on a mold base material, spherical particles are sprayed onto a surface of the cavity and angular apex portions of unevenness on the surface of the cavity generated by the engraving are ground to form a satin-finished face, and a thermosetting resin is molded using the mold with a plating layer (plating film) applied to a surface of the satin-finished surface (see PTL 3). However, this technique is directed to compression-molding of a thermosetting resin. Thus, it is not considered to be applied to compression-molding of a fiber-reinforced thermoplastic resin body having a high molding pressure, and also a grinding surface thereof, on which large unevenness remain after the engraving of cavity, is satin-finished. From these facts, it is far from an optically uniform and good appearance with grains of the present invention. In addition, a method for producing a shaped product has been proposed, in which an alicyclic structure-containing polymer resin is molded using a mold that is formed of a mold A having a concave portion and a mold B having a convex portion, in which a cylindrical cavity can be formed by the convex portion and the concave portion, and a surface of the convex portion has a Rockwell hardness C of 40 or more, a ten-point average roughness of greater than 0.5 μm and 2.5 μm or less, and a draft angle of 0° to 5° (see PTL 4). However, this technique is intended to avoid scratches generated due to damages of a surface of a cylindrical shaped product having a small draft angle caused by the mold in a case where the shaped product is released from the mold, and an object thereof is greatly deviated from that of the present invention which is to obtain an optically uniform and good appearance with grains. From the above, the technologies which have been proposed so far are not necessarily technologies specialized for improving an appearance of a shaped product with grains, and there is room for improvement.

CITATION LIST

Patent Literature

Patent Literature 1: US-A-2014/0186584
Patent Literature 2: U.S. Pat. No. 6,534,583
Patent Literature 3: JP-A-2004-042413
Patent Literature 4: JP-A-2004-136476

SUMMARY OF INVENTION

Technical Problem

The present inventor has carefully observed appearances of shaped products obtained by compression-molding fiber-reinforced thermoplastic resin materials using technologies in the related art, and has found that only in a case where the shaped products are observed from a specific angle, surfaces of the shaped products may appear to be colored differently (hereinafter simply referred to as whitening in some cases) as if mildew blooms on the surface, and such whitening is caused by strong light reflection of grains. Regarding the cause thereof, the present inventor has conceived that it is fine deformation, tearing, or peeling which occurs on a surface of a molded article with grains in a case where the shaped product with grains is released from a mold having a grained shape during compression molding.

An object of the present invention is to provide a fiber-reinforced resin shaped product which is excellent in appearance and has grains on at least a part of a surface thereof, and method for producing the same. As used herein, "excellent in appearance" means that with respect to an appearance of a shaped product, whitening does not occur at any angle in a predetermined area, and an optically uniform appearance is formed as intended, and also encompasses intentionally changing a shape of the grains for each specific area so that an appearance as desired is obtained for each area.

Solution to Problem

The present inventor has well observed a surface of a shaped product with grains, which contains reinforcing fibers and a thermoplastic resin, using a scanning electron microscope (hereinafter referred to as SEM in some cases), and realized that a surface of the shaped product with grains and with whitening was rough. Subsequently, the present inventor has found that by measuring a light reflectance for each angle using a goniometric reflectometer, the shaped product with grains and with whitening has a high maximum light reflectance and is sharp in angular distribution of reflectance thereof, as compared with a shaped product with grains and without whitening. The present inventor further measured a reflection-scattered light of the shaped product with grains and with whitening, and has found and established that the whitening is directional light scattering, and the reason why the directional light scattering occurs is a combination of not only a shape and dimension of the grains but also a surface roughening of the shaped product with grains and the like. The present inventor has thought that the surface roughening of the shaped product with grains is due to the fact that the shaped product with grains sticks strongly to a surface of a mold having a grained shape, and fine deformation, tearing, or peeling occurs on a surface of the shaped product with grains at the time of being released, and has found that by performing a flattening treatment such as polishing or plating on the mold surface having a grained shape, not only an appearance of the shaped product with grains is improved, but also the above whitening is suppressed. As a result of more intensive studies, the present inventor has found that with respect to a surface of a shaped product with grains, in a case where a ratio of a maximum reflectance (R) to a half-value width (H), each of which is obtained by goniophotometric measurement according to a method as described later, is within a certain region, a shaped product with grains which is excellent in appearance is obtained, and thus has completed the present invention.

That is, the present invention relates to a fiber-reinforced resin shaped product containing reinforcing fibers and a thermoplastic resin, having grains on at least a part of a surface thereof. A ratio of a maximum reflectance (R) to a half-value width (H) in a goniophotometric measurement of a surface of the fiber-reinforced resin shaped product satisfies Expression (1).

$$R/H \leq 0.034 \times R - 0.15 \tag{1}$$

In the expression, R is a maximum reflectance (%), and H is a half-value width (degree).

Advantageous Effects of Invention

A fiber-reinforced resin shaped product of the present invention having grains on at least a part of a surface thereof is extremely excellent in appearance by having specific light reflectivity.

BRIEF DESCRIPTION OF DRAWINGS

FIG. 2 is a photograph (taken with a digital camera) of an appearance of a shaped product with grains of Example 1 taken from above and obliquely ((a) and (b), respectively).

FIG. 3 shows a measurement result of reflection-scattered light (scattering and appearance measurement system IS-SA manufactured by Radiant Zemax LLC.) of the shaped product with grains of Comparative Example 1. A bidirectional reflectance distribution function (BRDF) of a Z-axis direction shows a reflection-scattering characteristic of light.

DESCRIPTION OF EMBODIMENTS

Figure 1A:
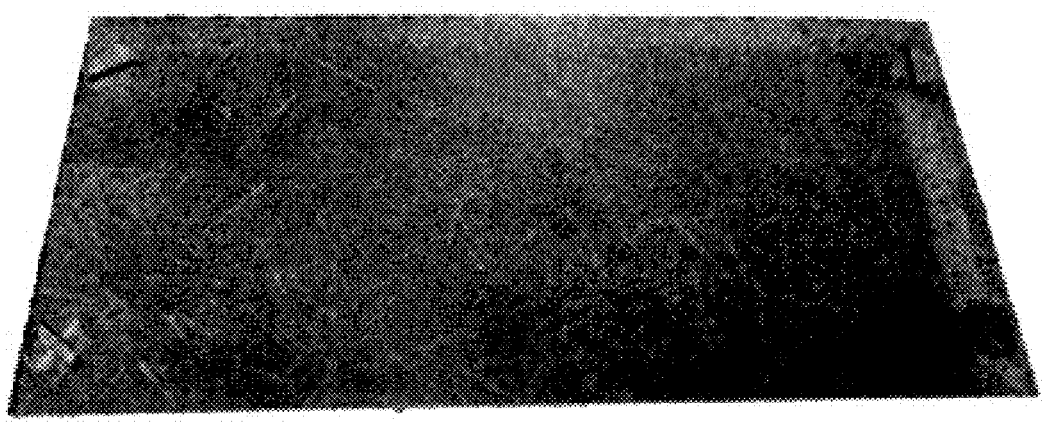
FIG. 1 is a photograph (taken with a digital camera) of an appearance of a shaped product with grains of Comparative Example 1 taken from above and obliquely ((a) and (b), respectively).

Hereinafter, embodiments of the present invention will be sequentially described. With respect to the present invention, unless otherwise noted, for the sake of simplicity, a fiber-reinforced thermoplastic resin material and a fiber-reinforced thermoplastic resin shaped product are referred to as a fiber-reinforced resin material and a fiber-reinforced resin shaped product, respectively.

(Grains)

Grains in the present invention refers to a pattern provided on a surface of a fiber-reinforced resin shaped product. The pattern is not particularly limited, and regular unevenness and/or wrinkles may be mentioned, and, conversely, irregular unevenness and/or wrinkles may be mentioned. Examples of the regular shape include a lattice shape, and examples of the irregular shape can include a leather shape.

The shaped product with grains of the present invention is a fiber-reinforced resin shaped product in which, preferably, a ratio (R/H) of a maximum reflectance (R) to a half-value width (H) in a goniophotometric measurement of a surface thereof using a method as described later satisfies Expression (1).

$$R/H \leq 0.034 \times R - 0.15 \quad (1)$$

In the expression, R is a maximum reflectance (%), and H is a half-value width (degree).

With respect to a fiber-reinforced resin shaped product, the present inventor has performed measurements on reflection of a mirror surface having no grains and light reflection of a fine grains which is reflection-scattered in almost all directions, and studied the results. The mirror surface shows a maximum reflectance at an incident angle and in the vicinity of a maximum reflection angle in a mirror image direction, and there is almost no angular distribution in reflectance thereof. On the other hand, it can be said that a maximum reflectance by fine grains is lower than a maximum reflectance of the mirror surface and an angular distribution of reflectance by the fine grains is broad as compared with the angular distribution of the mirror surface. A ratio (R/H) of a maximum reflectance (R) to a half-value width (H) shows sharpness in the angular distribution, which means that in a case where R/H is large, a sharp angular distribution is exhibited, and in a case where R/H is small, a broad angular distribution is exhibited. In consideration of the reflectance of the mirror surface and the fine grains, the present inventor has inferred that R/H and R are in a proportional relationship. As described above, since whitening which occurs in a shaped product with grains is directional light scattering, R/H and R of a shaped product having a uniform and good appearance without directional light scattering become smaller than R/H and R of a shaped product with grains and with whitening, in other words, ranges of R/H and R of the shaped product with grains and having a uniform and good appearance become smaller than ranges of R/H and R of the shaped product with whitening.

Based on the above consideration, the present inventor analyzed the aforementioned measurement results and reached the above-mentioned Expression (1) which is an empirical expression.

In order to increase the maximum reflectance (R) of the shaped product with grains, although a degree of change varies depending on grains pattern to be selected, it is sufficient to increase a depth of a grain of the grained pattern or to select a grained pattern having a small average pitch between adjacent grains, that is, between a certain grain and another grain adjacent thereto. In order to reduce the maximum reflectance (R) thereof, it is sufficient to reduce a depth of a grain of the grained pattern or to select a grained pattern having a large average pitch between adjacent grains, that is, between a certain grain and another grain adjacent thereto. In order to increase the ratio (R/H) of the maximum reflectance (R) to the half-value width (H) of the shaped product with grains, although a degree of change varies depending on a grained pattern to be selected, it is sufficient to increase the maximum reflectance (R) or to decrease the half-value width (H). In a case where the maximum reflectance (R) increases, the half-value width (H) tends to decrease and in a case where the maximum reflectance (R) decreases, the half-value width (H) tends to increase.

The term "whitening" with regard to the shaped product with grains of the present invention does not mean that a part of the shaped product actually contains a white substance and exhibits a white color, or the like, but means, as an optical phenomenon as described above, that a part of a surface of the shaped product with grains appears to be a different color from the other parts as if mildew blooms on the part only in a case where the shaped product with grains is observed from a specific angle. As used herein, the description that a part appears to be a different color, means that not only a part of a black shaped product with grains is white, or the like but also includes a case where the shaped product with grains has a part of which color is the same as the original color of the shaped product with grains but shade appears different therefrom. However, since many shaped products with grains are colored, as whitening to be observed, there are many cases where a part of the non-white shaped product with grains appears white as observed from a certain angle.

Due to presence of the above-described grains on at least a part of a surface of the fiber-reinforced resin shaped product of the present invention, the fiber-reinforced resin shaped product (shaped product with grains) is excellent in appearance.

With respect to at least a part of the surface that the shaped product with grains of the present invention has, there is no particular limitation on sites thereof, a proportion thereof relative to the entire surface area of the shaped product with grains, and the like, and a shaped product may have the above-described grains on a necessary surface region thereof according to applications.

The grained pattern used in the shaped product with grains of the present invention is not particularly limited as long as an effect of the present invention is not impaired, and it may be determined, for example, by visually observing grained samples produced by the grain texturing makers such as TANAZAWA HAKKOSHA CO., LTD. or Tenibac Co., Ltd. and considering surface appearance such as a visually observed appearance and hand feeling of the shaped product, functional properties such as difficulty of dirt attachment and ease of dirt removal, and the like. Regarding the grained samples produced by the grained texture makers (hereinafter abbreviated as grained sample in some cases), samples used are often obtained, for example, by injection-molding a black-colored unreinforced polypropylene resin using a mold having a grained shape. Thus, in a case where resin species constituting a shaped product is different, in a case where components affecting appearance such as reinforcing fibers or the like are contained, in a case where coloring is different, or in a case where a molding method is different from the grained sample, there may be a big difference in appearance between the grained sample and a shaped product with grains. Therefore, in order to suppress as much as possible difference in appearance between the grained sample and the shaped product with grains, it is desirable to select a grained shape that falls within a specific range.

That is, as a desirable grained shape in the present invention, a maximum height (Rz) of grains is, for example, 0.1 μm to 1,000 μm, preferably 1 μm to 800 μm, more preferably 5 μm to 500 μm, and an average pitch (Rsm) between adjacent grains, that is, between a certain grain and another grain adjacent thereto is 0.1 μm to 2,000 μm, more preferably 1 μm to 1,000 μm, still more preferably 500 μm to the above upper limit value, and particularly preferably 600 μm to the above upper limit value. With respect to the present invention, a maximum height (Rz) of grains is preferably a value calculated according to MS B0601:2001. Furthermore, as a desirable grained shape in the present invention, draft angles of the grains are preferably 0.01 degree to 50 degree, more preferably 0.1 degree to 40 degree, and particularly preferably 1 degree to 20 degree. In a case where a maximum height (Rz) of the grains is 1,000 μm or less, it is particularly easy to impart a grained shape to a mold, which in turn makes it easy to obtain a shaped product with the grains, and thus is industrially preferable. In a case where the maximum height (Rz) thereof is 0.1 μm or more, it is easy to distinguish appearance of the grains and a more excellent surface appearance is obtained. In a case where an average pitch (Rsm) between adjacent grains is 2,000 μm or less, reinforcing fibers hardly float to a concave portion or flat portion constituting the grained shape and an excellent surface appearance is obtained. With regard to grains having the average pitch (Rsm) of 0.1 μm or more, it is easy to distinguish appearance of the grains and a more excellent surface appearance is obtained. In a case where draft angles of grains are 0.01 degree or more, it is more easily released during molding, which is preferable, and in a case where the draft angle is 50 degree or less, it is easily recognized as a pattern and a high surface appearance is obtained, which is preferable. In addition, as a technique of facilitating releasing during molding, it is possible to increase a radius of curvature of the grained shape. In a case where an aspect ratio is large, for example, a grained shape has a long axis direction and a short axis direction, it is preferable that requirements in the present invention are satisfactory in the short axis direction.

The shaped product with grains of the present invention may have a plurality of regions with different shapes of grains on a surface thereof, may have grains with the same shape in a plurality of separated regions that are not adjacent to one another, or may have grains with different shapes. Provided that the shaped product with grains of the present invention has grains in a plurality of regions, in a case where at least one region satisfies the requirements of the maximum height (Rz) and the average pitch (Rsm) of grains as described above, other regions may not satisfy the requirements. However, it is preferable that the grains in all regions satisfy the requirements.

In the present invention, as a technique of forming grains on a fiber-reinforced resin material, it is preferable to use a technique of processing a grained shape into a molding mold and transferring the grained shape to the fiber-reinforced resin material. A mold having a grained shape has, in a cavity of the mold, a grained shape part corresponding to a location equivalent to a part providing a shaped product with grains. In other words, the mold having a grained shape used in connection with the present invention is a mold having a grained shape on at least a part of a molding surface, and this is also referred to as a mold having a grained shape on a surface thereof (Spraying and Polishing of Mold Surface Having Grained Shape)

A mold having a grained shape is formed by, first, undergoing a step of forming a desired grained shape on a surface of the mold by a shape processing method such as etching, cutting or electric discharge machining, and washing the mold surface. At this stage, irregularity corresponding to each shape processing method may remain. In order to suppress irregularity, before the shape processing, the mold may be polished at a mirror surface thereof, and the polishing level may be appropriately selected, for example, in a range of #100 to #1000. The mold surface that has undergone a washing step is sprayed and polished with spherical particles such as sand, glass beads, resin beads, or metal beads which are unused and have a particle size within a certain range. This polishing may be performed once or plural times, and a particle diameter and type of the spherical particles may be used according to polishing purposes. Although the spherical particles may be used in combination, it is preferable that for the first time, a spraying and polishing is performed using sand with high hardness and large particle diameter, and for the second time, a spraying and polishing is performed using glass beads with low hardness and small particle diameter. Specifically, for example, this is a method of spraying and polishing a mold surface having a grained shape with sand for sandblasting of #20 using a sandblasting gun under a spraying pressure and the number of spraying at which a desired polishing is obtained, and then performing spraying and polishing by changing the sand to glass beads for sandblasting having a particle diameter of 90 μm to 125 μm, and the like. Spherical particles may not be used in circulation and discharged out of the mold without being used again for grinding so that new spherical particles are always sprayed. As a result, a smooth grained shape surface can be rapidly formed.

After the spraying and polishing, finish polishing such as buff polishing or hand polishing may be further added. As a polishing agent, fine powders made of SiC, $Al_2O_3$, $Cr_2O_3$, or the like are exemplified, and an average particle diameter thereof is preferably 4 μm or less, and more preferably 1 μm or less. As a finish polishing operation, a method is exemplified which includes scattering the above-mentioned polishing agent on a mold surface having a grained shape, performing polishing with a foam or cloth until a desired polishing is obtained, or performing polishing using a foam or the like coated with the above-mentioned polishing agent, or the like.

By the above polishing, the mold surface having the grained shape becomes smooth, and in a light reflectivity of a shaped product with grains which has been molded using the mold, a ratio of the maximum reflectance (R) to the half-value width (H), each of which is obtained by a method specified herein satisfies Expression (1), and an optically uniform and good appearance is viewed at any angle. In addition, by appropriately selecting a polishing method and a polishing level to the extent that an effect of the present invention is not impaired, it is possible to obtain an appearance close to a grained sample. Polishing methods and conditions are appropriately selected depending on a grained pattern to be selected, a depth of a grain, and draft angles of grains, and are not particularly limited.

$$R/H \leq 0.034 \times R - 0.15 \quad (1)$$

In the expression, R is a maximum reflectance (%), and H is a half-value width (degree).

In order to increase the maximum reflectance (R) of the shaped product with grains, although a degree of change varies depending on a grained pattern to be selected, a depth of a grain, and an average pitch between adjacent grains, it is sufficient to make a level of the above polishing rough. Specifically, the level of polishing can be made rough by, for example, increasing a particle diameter of spherical particles in a case of performing polishing by spraying the spherical particles. Conversely, in order to reduce the maximum reflectance (R), it is sufficient to make a level of polishing fine. Specifically, the level of polishing can be made fine by, for example, decreasing a particle diameter of spherical particles in a case of performing polishing by spraying the spherical particles. In order to increase the ratio (R/H) of the maximum reflectance (R) to the half-value width (H) of the shaped product with grains, although a degree of change varies depending on a grained pattern to be selected, a depth of a grain, and an average pitch between adjacent grains, it is sufficient to increase the maximum reflectance (R) or to decrease the half-value width (H). In a case where the maximum reflectance (R) increases, the half-value width (H) tends to decrease and in a case where the maximum reflectance (R) decreases, the half-value width (H) tends to increase.

(Plating Film on Mold Surface Having Grained Shape)

Due to the fact that polishing irregularity may remain on a mold surface having a grained shape after a spraying and polishing and further a finish polishing, depending on a grained pattern to be selected, a depth of a grain, and a draft angle of grains, there are some cases where a ratio of the maximum reflectance (R) and the half-value width (H) of the shaped product with grains cannot be adjusted to a range satisfying Expression (1) with the above-described polishing alone. In that case, in order to obtain a mold surface having a more smooth grained shape, it is preferable to perform plating on the mold surface having a grained shape to form a plating film. A plating bath solution in a plating step is not particularly limited, and a plating bath composed of hard chromium is suitably used. A grained shape on a molding surface of a mold used for obtaining a shaped product with grains of the present invention preferably has a film thickness of plating of 5 to 30 μm. In a case where a plating film thickness is smaller than 5 μm, the plating is peeled off as the number of molding increases, so that an effect of smoothing polishing irregularity is reduced, whereas in a case where it is larger than 30 μm, the time for immersing the mold in a plating bath becomes longer or the number of molding becomes larger, which is not industrially preferable. Although it is preferable to perform the plating after the above spraying and polishing, it may be performed after the finish polishing. With the above plating, the mold surface having a grained shape becomes smooth, and a shaped product with grains obtained by molding using the mold is uniform and good in appearance. Plating methods and conditions are appropriately selected depending on a grained pattern to be selected, a depth of a grain, or draft angles of grains, and a polishing method and level, and are not particularly limited. The entire grained shape on the mold surface may have a plating film, but only a part of the grained shape may have a plating film. Each part of the grained shape may have a different film thickness or a different type of metal plating film.

As is apparent from the above description and a method for producing a shaped product with grains as described later, the present invention also includes the following inventions for a mold and a method for producing the same.

1. A mold for press molding which is composed of a pair of an upper mold and a lower mold and has a grained shape on at least a part of a molding surface.

2. The mold for press molding according to 1, in which grains of the grained shape has a depth of 1 μm to 800 μm.

3. The mold for press molding according to 1 or 2, in which an average pitch (Rsm) between a certain grain and a grain adjacent thereto is 0.1 μm to 2,000 μm.

4. The mold for press molding according to any one of 1 to 3, in which draft angles of the grains are 0.01 degree to 50 degree.

5. The mold for press molding according to any one of 1 to 4, in which the grained shape has a plating film with a thickness of 5 to 30 μm.

6. A method for producing the mold for press molding according to any one of 1 to 5, including a treatment of spraying and polishing the grained shape with spherical particles.

7. The method for producing the mold for press molding according to 6, including a treatment of spraying and polishing the grained shape with spherical particles, and then providing the grained shape with a plating film.

(Shaped Product with Grains)

A shaped product with grains of the present invention has the above grains on at least a part of a surface thereof and contains reinforcing fibers and a thermoplastic resin, more precisely, a thermoplastic resin as a matrix.

Preferred examples of the reinforcing fibers and the thermoplastic resin contained in the shaped product with grains of the present invention will be described later together with preferable ones contained in a fiber-reinforced resin material as a molding material. In a shaped product with grains of the present invention, a preferable range of a parts-by-weight amount of the thermoplastic resin per 100 parts by weight of the reinforcing fibers is the same as described for the fiber-reinforced resin material.

A volumetric fraction of the reinforcing fibers contained in the shaped product with grains of the present invention is not particularly limited, and with respect to the reinforcing fibers and the thermoplastic resin as a matrix, the volumetric fraction (Vf) of the reinforcing fibers defined by Expression (u) is preferably 5% to 80%, and Vf is more preferably 20% to 60%.

$$Vf = 100 \times \text{reinforcing fiber volume}/(\text{reinforcing fiber volume} + \text{thermoplastic resin volume}) \quad \text{Expression (u)}$$

In a case where Vf of the shaped product with grains is higher than 5%, a reinforcing effect due to the reinforcing fibers is sufficiently exhibited, which is preferable, and in a case where Vf is 80% or less, voids are hardly generated in an obtained shaped product with grains, that is, a possibility of deteriorated physical properties is reduced, which is preferable. In a case of a shaped product with grains which has a different Vf depending on a site thereof, it is preferable that an average value of Vf's falls within the above range, and it is more preferable that both the minimum value and the maximum value of Vf's are within the above range.

As will be described later, in a case of obtaining a shaped product with grains of the present invention by molding a fiber-reinforced resin material, unless, in addition to the fiber-reinforced resin material, other fiber-reinforced resin material, reinforcing fibers, a thermoplastic resin, or the like is added in molding, Vf of the fiber-reinforced resin material can be regarded as Vf of the shaped product with grains.

A shape of the shaped product with grains of the present invention is not particularly limited, and may be a flat-plate shape or a three-dimensional shape, or may have a so-called rising part such as a rib or a boss, a curved surface part, a hole part, a part with different thickness, or a deep-drawn-shaped part.

A thickness of the shaped product with grains of the present invention is not particularly limited, and it is usually preferably from 0.01 mm to 100 mm, more preferably from 0.01 mm to 50 mm, still more preferably from 0.01 mm to 10 mm, even more preferably from 0.01 mm to 5 mm, even further preferably 0.1 mm to 5 mm, and particularly preferably 1 to 3 mm. In a case of a shaped product which has a different thickness depending on a site thereof, it is preferable that an average thickness falls within the above range, and it is more preferable that both the minimum value and the maximum value are within the above range. A size of the shaped product of the present invention is not particularly limited, and is appropriately set according to applications.

In the shaped product with grains of the present invention, a ratio (hereinafter abbreviated as Eδ value in some cases) of a larger value divided by a smaller value for a tensile modulus in a predetermined direction and a direction orthogonal thereto (hereinafter referred to as 0 degree direction and 90 degree direction, respectively, in some cases) is preferably less than 2, more preferably 1.5 or less, and still more preferably 1.3 or less. Eδ is an index of in-plane isotropy of the material. In a case where Eδ is less than 2, an in-plane isotropy is obtained. In a case where Eδ is less than 1.5, an excellent in-plane isotropy is obtained, and in a case where Eδ is 1.3 or less, a particularly excellent in-plane isotropy is obtained. As is clear from the definition, the minimum value of the Eδ value is 1.0.

The shaped product with grains of the present invention may be further molded into a desired shape, and may be press-molded again as necessary in order to improve surface properties. For example, a so-called insert molding may be performed by disposing a shaped product with grains on a mold of an injection molding machine, injecting a resin-based material, and performing injection molding, so that a special shape is provided at a certain portion.

(Method for Producing Shaped Product with Rains)

As a method for producing a fiber-reinforced resin shaped product (shaped product with grains) of the present invention, there is a method of molding a fiber-reinforced resin material as described later.

With respect to the present invention, a specific method for molding the fiber-reinforced resin material is not particularly limited, and a press molding (compression molding) is mentioned as a preferable method in that break of the reinforcing fibers in the fiber-reinforced resin material hardly occurs, and productivity and in-plane isotropy of the molding material are easily maintained. Among these, a so-called cold press molding is preferable due to high productivity, in which a shaped product is obtained by a production method including an operation of disposing a fiber-reinforced resin material, which is heated just before molding and is in a plastic state, in a mold having a grained shape regulated to be in a temperature less than a plasticizing temperature of the fiber-reinforced resin material, and clamping the mold. As a method for heating the fiber-reinforced resin material, a hot-air heater, an infrared heating device, or the like is used.

A specific example of the cold press molding is as follows: A fiber-reinforced resin material is heated to a plasticizing temperature, which is equal to or higher than a softening temperature of the thermoplastic resin as a matrix thereof +30° C. and equal to or less than a decomposition temperature, to bring it into a plastic state, then disposed in a mold which is composed of a pair of an upper mold and a lower mold and adjusted to a temperature equal to or lower than the softening temperature of the thermoplastic resin, clamped and pressurized, and a shaped product, which is cooled and solidified, is removed from the mold.

In the above-mentioned cold press molding, a temperature (heating temperature) at which the fiber-reinforced resin material is heated to bring it into a plastic state is preferably equal to and higher than a softening temperature +15° C. to decomposition temperature −30° C. In a case where the heating temperature is within the above range, the matrix resin is sufficiently melted and plasticized to be easily molded, and almost no decomposition of the thermoplastic resin proceeds, which is preferable.

In the above-mentioned cold press molding, as a pressurizing condition, a press pressure is preferably 0.1 MPa to 20 MPa, more preferably 0.2 MPa to 15 MPa, and still more preferably 0.5 MPa to 10 MPa. In a case where the press pressure is 0.1 MPa or more, since the fiber-reinforced resin material is sufficiently pressed out, springback and the like hardly occur and a material strength is less likely to deteriorate. In addition, in a case where the pressure is 20 MPa or less, for example, even for a large fiber-reinforced resin material, press molding can be often performed by a more general press machine, rather than a very large special press machine, which is economically preferable.

In a case where the thermoplastic resin as a matrix of the fiber-reinforced resin material is crystalline, a temperature inside the mold during pressurization, that is, a mold temperature at the time of clamping the mold is preferably higher by 10° C. or more than a glass transition temperature of the thermoplastic resin. In this case, it is possible to more uniformly transfer a grained shape of the mold to a shaped product to be imparted with grains. In particular, in a case where a weight average fiber length of the fiber-reinforced resin material is 1 mm to 100 mm, since the reinforcing fibers are long and hinder transfer of the grained shape, it is more preferable that a temperature inside the mold during pressurization is higher by 20° C. than a glass transition temperature of the thermoplastic resin. However, in a case where the temperature inside the mold increases, since transfer of the grained shape proceeds further, the fiber-reinforced resin material strongly sticks to a mold surface, and fine deformation, tearing, or peeling easily occurs on a surface of the shaped product with grains at the time of being released, and therefore a maximum reflectance/half-value width defined in the present invention is close to a threshold value, which is not preferable. When the mold temperature becomes higher, an upper limit of the temperature inside the mold after being pressurized depends on a glass transition temperature of the thermoplastic resin. However, the upper limit of the temperature inside the mold after being pressurized is preferably lower by 20° C. or less than a softening temperature of the thermoplastic resin as a matrix of the fiber-reinforced resin material since a melted fiber-reinforced resin material is cooled and solidified, and the fiber-reinforced resin shaped product is formed. In the present invention, the softening temperature of the resin is a crystal melting temperature, that is, a so-called melting point for a crystalline thermoplastic resin, and a glass transition temperature for an amorphous thermoplastic resin. The temperature inside the mold during the pressurization and the temperature inside the mold after the pressurization may be the same as or different from each other as long as a desired fiber-reinforced resin shaped product is formed, and in a case where they are different from each other, a technology in the related art, for example, a heat-and-cool molding technology or a rapid heating-and-cooling technology of a mold may be used, in which a method and level of heating and cooling the mold are not particularly limited.

As described above, the conditions of the cold press molding have been described in detail, but the shaped product with grains of the present invention can also be produced by a hot press molding. Conditions of heating and pressurizing at the time of producing the shaped product with grains of the present invention by the hot press molding are preferably those conforming to the above-mentioned conditions at the time of performing the cold press molding.

In a case where it is possible to obtain a shaped product with grains as described above, a shaped product with grains may be obtained by producing a fiber-reinforced resin shaped product without grains by press molding, and then bringing an object having a grained shape into a high temperature and pressing it against a predetermined portion of the shaped product.

(Fiber-Reinforced Resin Material)

The fiber-reinforced resin material used in the present invention contains reinforcing fibers and a thermoplastic resin as a matrix resin.

The amount present of the thermoplastic resin as a matrix resin in the fiber-reinforced resin material can be appropriately determined depending on a type of the thermoplastic resin, a type of the reinforcing fibers, and the like, and is not particularly limited; and it is usually preferably in a range of 3 parts by weight to 1,000 parts by weight, with respect to 100 parts by weight of the reinforcing fibers. The amount present of the thermoplastic resin per 100 parts by weight of the reinforcing fibers in the fiber-reinforced resin material is more preferably 30 parts by weight to 200 parts by weight, and still more preferably 30 parts by weight to 150 parts by weight. In a case where the matrix resin is 3 parts by weight or more with respect to 100 parts by weight of the reinforcing fibers, impregnation proceeds sufficiently and dry reinforcing fibers tend to decrease. In addition, in a case of being 1,000 parts by weight or less, the amount of reinforcing fibers is sufficient and it is often appropriate as a structural material. In a shaped product with grains or a fiber-reinforced resin material of the present invention, in a case where there are sites having different amounts present of the thermoplastic resin per 100 parts by weight of the reinforcing fibers, it is preferable that the different amounts present over the entire shaped product with grains correspond to the above-mentioned range of parts by weight. With respect to the present invention, the expression "weight" is used for the sake of convenience, but it is precisely a mass.

Examples of an orientation state of the reinforcing fibers in the fiber-reinforced resin material can include a unidirectional orientation in which a long-axis direction of the reinforcing fibers is oriented in one direction, and a two-dimensional random orientation in which the long-axis direction is randomly oriented in an in-plane direction of the fiber-reinforced resin material.

The orientation state of the reinforcing fibers in the present invention may be any of the unidirectional orientation or the two dimensional random orientation. In addition, an irregular orientation (oriented state in which the long-axis direction of the reinforcing fibers is not completely oriented in one direction and is not perfectly random) in the middle of the unidirectional orientation and the two-dimensional random orientation may be used. Furthermore, depending on a fiber length of the reinforcing fibers, the long-axis direction of the reinforcing fibers may be oriented so as to have an angle with respect to the in-plane direction of the fiber-reinforced resin material; it may be oriented so that the fibers are entangled cotton-like; and, further, it may be oriented so that the fibers are biaxial woven fabrics such as plain weave and twill weave, multiaxial woven fabrics, nonwoven fabrics, mats, knits, braids, or paper made of reinforcing fibers.

In particular, in a case of numerically defining that the reinforcing fibers contained in the fiber-reinforced resin material or the shaped product with grains are in the two-dimensional random orientation, as disclosed in JP-A-2012-246428, a preferable two-dimensional random orientation for the reinforcing fibers may be set as a state where a degree of plane orientation σ is 90% or more, in which the degree of plane orientation σ is defined by a σ=100×(1−(number of reinforcing fibers having plane orientation angle γ of 10° or more)/(total number of reinforcing fibers)).

Further, with respect to any rectangular region in a cross section obtained by cutting the shaped product specimen in a thickness direction, the thickness direction of the shaped product or a direction different from the thickness direction of the shaped product is set as a Z direction, and observation, measurement, and calculation of degree of plane orientation a for the reinforcing fibers may be performed according to the above publication. In that case, regarding an angle between the long-axis of the reinforcing fiber cross section and the surface of a molding plate, which is necessary for calculating the plane orientation angle γ, an angle between the long-axis of the reinforcing fiber cross section and an upper side or lower side of a rectangular region to be observed, rather than the surface of a molding plate, may be used.

In the present invention, reinforcing fiber mats mean those obtained by causing reinforcing fibers to be deposited or entangled with one another to form a mat. As the reinforcing fiber mat, a two-dimensional random reinforcing fiber mat in which a long-axis direction of the reinforcing fibers is randomly oriented in an in-plane direction of a fiber-reinforced resin shaped product, or a three-dimensional random reinforcing fiber mat in which the reinforcing fibers are, for example, entangled cotton-like so that the long-axis direction of the reinforcing fibers is randomly oriented in each direction of XYZ.

In the present invention, an isotropic base material is one of the modes of the fiber-reinforced resin material, and is one in which a thermoplastic resin is contained in the reinforcing fiber mat. In the isotropic base material of the present invention, as a mode in which the thermoplastic resin is contained in the reinforcing fiber mat, for example, a mode in which a powdery, fibrous, or bulky thermoplastic resin is contained in the reinforcing fiber mat, or a mode in which a thermoplastic resin layer containing a thermoplastic resin is mounted or stacked on the reinforcing fiber mat can be mentioned. As the isotropic base material, an in-plane isotropic base material containing a two-dimensional random reinforcing fiber mat is preferable.

In the fiber-reinforced resin material used in the present invention, reinforcing fibers with different orientation states may be contained in one fiber-reinforced resin material.

As a mode in which reinforcing fibers with different orientation states are contained in a fiber-reinforced resin material, for example, (i) a mode in which reinforcing fibers with different orientation states are disposed in an in-plane direction of the fiber-reinforced resin material, and (ii) a mode in which reinforcing fibers with different orientation states are disposed in a thickness direction of the reinforced resin material, can be mentioned. In addition, in a case where the fiber-reinforced resin material has a stacked structure composed of a plurality of layers, (iii) a mode in which orientation states of reinforcing fibers contained in the respective layers are different can be mentioned. Further, modes in which the above respective modes (i) to (iii) are combined can also be mentioned.

An orientation mode of the reinforcing fibers in the fiber-reinforced resin material can be determined, for example, by performing a tensile test with reference to an arbitrary direction of the fiber-reinforced resin material and a direction orthogonal to the arbitrary direction, to measure a tensile modulus, and then calculating a ratio (Eδ) obtained by dividing a larger one by a smaller one among the measured tensile modulus values. As the ratio of the elasticities is closer to 1, it can be evaluated that the reinforcing fibers are oriented isotropically. In a case where the ratio obtained by dividing a larger one by a smaller one among the values of the elasticities in two orthogonal directions does not exceed 2, it is evaluated as being in-plane isotropic. In a case where this ratio is less than 1.5, it is evaluated as being excellent in in-plane isotropy. In a case where this ratio does not exceed 1.3, it is evaluated as being particularly excellent in in-plane isotropy.

An areal weight of the reinforcing fibers in the fiber-reinforced resin material is not particularly limited, and a lower limit thereof is usually 25 g/m$^2$ to 10,000 g/m$^2$. In a case where a fiber-reinforced resin material is press-molded to produce a shaped product with grains, unless reinforcing fibers or a molding material is added, the areal weight of the reinforcing fibers in the fiber-reinforced resin material can be regarded as an areal weight of the reinforcing fibers in the obtained shaped product with grains.

A thickness of the fiber-reinforced resin material used in the present invention is not particularly limited, and is usually preferably in a range of 0.01 mm to 100 mm, preferably in a range of 0.01 mm to 5 mm, and more preferably in a range of 1 mm to 5 mm.

In a case where the fiber-reinforced resin material used in the present invention has a structure in which a plurality of layers are stacked, the thickness does not indicate a thickness of each layer, but a thickness of the entire fiber-reinforced resin material obtained by totaling the thicknesses of the respective layers.

The fiber-reinforced resin material used in the present invention may have a single layer structure composed of a single layer or may have a stacked structure in which a plurality of layers are stacked.

As a mode in which the fiber-reinforced resin material has the above-described stacked structure, a mode in which a plurality of layers having the same composition are stacked may be adopted, or a mode in which a plurality of layers having different compositions are stacked may be adopted.

Further, as a mode in which the fiber-reinforced resin material has the above-described stacked structure, a mode in which layers having different oriented states of reinforcing fibers are stacked on top of each other may be adopted. As such a mode, for example, a mode obtained by stacking, on top of each other, a layer in which reinforcing fibers are unidirectionally oriented and a layer in which reinforcing fibers are two-dimensionally randomly oriented can be mentioned.

In a case where three or more layers are stacked, a sandwich structure composed of a predetermined core layer and a skin layer stacked on each of front and back surfaces of the core layer may be used.

(Reinforcing Fibers)

Although carbon fibers are preferable as the reinforcing fibers contained in the shaped product with grains of the present invention and the fiber-reinforced resin material, any of inorganic fibers other than the carbon fibers or organic fibers can be used depending on a type of a matrix resin, applications of a fiber-reinforced resin material, or the like.

Examples of the inorganic fibers other than the carbon fibers can include mineral fibers such as activated carbon fibers, graphite fibers, glass fibers, tungsten carbide fibers, silicon carbide fibers (silicon carbide fibers), ceramic fibers, alumina fibers, natural fibers, and mineral fiber such as basalt, boron fibers, boron nitride fibers, boron carbide fibers, and metal fibers.

Examples of the metal fibers can include aluminum fibers, copper fibers, brass fibers, stainless steel fibers, and steel fibers.

Examples of the glass fibers can include those made of E glass, C glass, S glass, D glass, T glass, quartz glass fibers, borosilicate glass fibers, or the like.

Examples of the organic fibers can include fibers made of a resin material such as aramid, polyparaphenylene benzoxazole (PBO), polyphenylene sulfide, polyester, acrylic, polyamide, polyolefin, polyvinyl alcohol, or polyarylate.

The reinforcing fibers contained in the shaped product with grains or the fiber-reinforced resin material of the present invention is one or more reinforcing fibers selected from the group consisting of carbon fibers, glass fibers, aramid fibers, boron fibers, and basalt fibers, and those in a weight average fiber length range as described later are more preferable.

In the present invention, two or more types of reinforcing fibers may be used in combination. In this case, plural types of inorganic fibers may be used in combination, plural types of organic fibers may be used in combination, and inorganic fibers and organic fibers may be used in combination.

As a mode in which a plurality of types of inorganic fibers are used in combination, for example, a mode in which carbon fibers and metal fibers are used in combination, a mode in which carbon fibers and glass fibers are used in combination, and the like can be mentioned. On the other hand, as a mode in which a plurality of types of organic fibers are used in combination, for example, a mode in which aramid fibers and fibers made of another organic material are used in combination can be mentioned. Further, as a mode in which the inorganic fibers and the organic fibers are used in combination, for example, a mode in which the carbon fibers and the aramid fibers are used in combination can be mentioned.

In the present invention, as the reinforcing fibers, carbon fibers are preferable. This is because the carbon fibers make it possible to obtain a fiber-reinforced resin material that is lightweight and excellent in strength.

As the carbon fibers, in general, polyacrylonitrile (PAN)-based carbon fibers, petroleum pitch-based carbon fibers, coal pitch-based carbon fibers, rayon-based carbon fibers, cellulose-based carbon fibers, lignin-based carbon fibers, phenol-based carbon fibers, vapor-grown carbon fibers, and the like are known, and any of these carbon fibers can be suitably used in the present invention.

Among these, in the present invention, it is preferable to use polyacrylonitrile (PAN)-based carbon fibers from the viewpoint of an excellent tensile strength. In a case where PAN-based carbon fibers are used as the reinforcing fibers, a tensile modulus thereof is preferably in a range of 100 GPa to 600 GPa, more preferably in a range of 200 GPa to 500 GPa, and still more preferably in a range of 230 GPa to 450 GPa. In addition, a tensile strength thereof is preferably in a range of 2,000 MPa to 10,000 MPa, and more preferably in a range of 3,000 MPa to 8,000 MPa.

The reinforcing fibers used in the present invention may have a sizing agent adhered to a surface thereof in order to improve adhesiveness to a matrix resin. In a case of using reinforcing fibers to which a sizing agent is adhered, a type of the sizing agent can be appropriately selected depending on types of the reinforcing fibers and the matrix resin, and is not particularly limited.

An adhesion strength between reinforcing fibers and a matrix resin is desirably 5 MPa or more in terms of strength in a strand tensile shear test. In addition to selection of the matrix resin, for example, in a case where the reinforcing fibers are carbon fibers, such strength can be improved by a method of changing a surface oxygen concentration ratio (O/C), a method of increasing an adhesion strength between carbon fibers and a matrix resin by applying a sizing agent to the carbon fibers, or the like.

In the present invention, in a case where at least a part of the reinforcing fibers is in the form of a single fiber, an effect thereof becomes extremely remarkable. On the other hand, in order to increase fluidity of a fiber-reinforced resin material during molding, it is preferable that a shape of a part of the reinforcing fibers forms a bundle of single fibers. The reinforcing fibers used in the present invention may be a shape of a single fiber only or a shape of a bundle of single fibers only. However, in a case of having both of them, a more effect of the present invention can be obtained. The term "a bundle of single fibers" means that two or more reinforcing single fibers are brought into close proximity to one another due to a sizing agent, an electrostatic force, or the like, and are present in a bundle shape. The number of reinforcing single fibers forming the bundle of single fibers is preferably 280 or more, and more preferably 600 or more.

In the present invention, in a case where a shape of a bundle of single fibers of reinforcing fibers are used, the number of single fibers constituting each bundle of single fibers may be substantially uniform or different from one another in the respective bundle of single fibers.

A weight average fiber length of the reinforcing fibers contained in the shaped product with grains and the fiber-reinforced resin material of the present invention is preferably from 1 mm to 100 mm. In a case where the weight average fiber length of the reinforcing fibers is within such a range, dimensional accuracy of the shaped product with grains becomes good. The weight average fiber length is more preferably 5 mm to 100 mm, and still more preferably 10 mm to 100 mm.

As the reinforcing fibers used in the present invention, not only discontinuous fibers having a weight average fiber length of 100 mm or less, which are excellent in in-plane isotropy of strength and dimensions as described above may be used, but also continuous fibers may be used depending on purposes.

In the present invention, reinforcing fibers having different fiber lengths may be used in combination. In other words, the reinforcing fibers used in the present invention may have a single peak or a plurality of peaks in an average fiber length.

For example, the average fiber length of the reinforcing fibers can be obtained by measuring fiber lengths of 100 fibers randomly extracted from the fiber-reinforced resin material up to a unit of 1 mm using a caliper or the like and performing calculation based on Expressions (m) and (f). A method of extracting the reinforcing fibers from the fiber-reinforced resin material can be performed, for example, by subjecting the fiber-reinforced resin material to a heat treatment at 500° C.×1 hour and removing the resin in a furnace.

Number average fiber length $Ln=\Sigma Li/j$  (m)

(in the expression, Li is a fiber length of each of the reinforcing fibers and j is the number of the reinforcing fibers)

Weight average fiber length $Lw=(\Sigma Li^2)/(\Sigma Li)$  (f)

(in the expression, Li is a fiber length of each of the reinforcing fibers.)

In a case where the fiber lengths are constant, such as being cut with a rotary cutter, the number average fiber length can be regarded as a weight average fiber length.

In the present invention, either the number average fiber length or the weight average fiber length may be adopted. However, it is often the weight average fiber length that can more accurately reflect physical properties of the fiber-reinforced resin material.

A diameter of a single fiber of the reinforcing fibers used in the present invention may be appropriately determined according to a type of the reinforcing fibers, and is not particularly limited.

In a case where carbon fibers are used as the reinforcing fibers, the average of diameters of single fibers is usually preferably in a range of 3 μm to 50 μm, more preferably in a range of 4 μm to 12 μm, and still more preferably in a range of 5 μm to 8 μm.

On the other hand, for example, in a case where glass fibers are used as the reinforcing fibers, the average of diameters of single fibers is usually preferably in a range of 3 μm to 30 μm.

Here, the average of diameters of single fibers refers to diameters of single fibers of the reinforcing fibers as the name implies. However, in a case where the reinforcing fibers are bundles of single fibers, the average of diameters of single fibers may also be abbreviated as an average fiber diameter.

The average of diameters of single fibers of the reinforcing fibers can be measured, for example, by the method described in JIS R 7607: 2000.

As described above, the reinforcing fibers used in the present invention preferably include those of a shape of a bundle of single fibers, that is, those in which two or more reinforced single fibers are brought into close proximity to one another due to a sizing agent, an electrostatic force, or the like and are present in a bundle shape. With respect to the present invention, reinforcing fibers of a shape of a bundle of single fibers are referred to as a reinforcing fiber bundle for convenience in some cases. One reinforcing fiber bundle functions as one filler in a fiber-reinforced resin shaped product or a molding material thereof. In a case where an individual reinforcing fiber that is randomly picked with a tweezer or the like from a reinforcing fiber specimen that has been obtained from a fiber-reinforced resin shaped product or a molding material by removing a thermoplastic resin as a matrix thereof is a bundle of single fibers, this individual reinforcing fiber can be regarded as a reinforcing fiber bundle.

As the reinforcing fiber bundle, one in which a plurality of single fibers are oriented approximately in the same direction and longitudinal side faces thereof are brought into contact with one another to be in a bundle shape is representative, but the present invention is not limited to this form. For example, a bundle shape, in which a plurality of single fibers are oriented in various directions, may be adopted, and a bundle shape, in which a plurality of single fibers are close to one another on a part of the longitudinal side faces, and single fibers are separated from one another at parts other than that, may also be adopted. In a case where the reinforcing fibers used in the present invention are a shape of a bundle of single fibers, the number of single fibers constituting each bundle of single fibers is not particularly limited, and is usually in a range of 2 to 100,000.

For example, in general, carbon fibers are a shape of a bundle of single fibers in which several thousands to several tens of thousands of single fibers are gathered. In a case where carbon fibers or the like are used as the reinforcing fibers, upon using a bundle of single fibers as it is, an entanglement part of the bundle of single fibers may become locally thick and thus make it difficult to obtain a thin-walled fiber-reinforced resin material. Therefore, in a case where a shape of a bundle of single fibers of reinforcing fibers is used, it is usual to use the bundle of single fibers by widening or opening the same.

In a case where the shape of a bundle of single fibers reinforcing fibers are widened or opened, for the reinforcing fibers in the present invention, a proportion of the reinforcing fibers (A) composed of the number of single fibers equal to or more than a critical single fiber number defined by Expression (2) is preferably 20 vol % or more, more preferably 30 vol % or more, still more preferably 40 vol % or more, and particularly preferably 50 vol % or more, with respect to a total amount of the reinforcing fibers, $$\text{Critical single fiber number} = 600/D \tag{2}$$

(in the expression, D is an average fiber diameter (μm) of the reinforced single fibers). As reinforcing fibers other than the reinforcing fibers (A), there may be one in single fiber state or a bundle composed of single fibers, the number of the single fibers in the bundle being smaller than a critical single fiber number. Hereinafter the reinforcing fibers other than the reinforcing fibers (A) are referred to as reinforcing fibers (B) in some cases. In the reinforcing fibers of the present invention, it is possible to reduce a thickness of the reinforcing fibers (A) composed of equal to or greater than a specific number of single fibers and to reduce irregularity in thickness of the fiber-reinforced resin material by setting the number of bundles of the reinforcing fibers (A) per unit weight (g) of the reinforcing fibers to be in a specific range. Thus, by performing molding, it is possible to obtain a fiber-reinforced resin shaped product that is excellent in mechanical properties even with a thin thickness.

In a case where a proportion of the amount of the reinforcing fibers (A) to a total amount of the carbon fibers is 20 vol % or more, it is possible to obtain a fiber-reinforced composite material having a high volume fraction of reinforcing fibers at the time of molding the fiber-reinforced resin material of the present invention, which is preferable. On the other hand, an upper limit of the proportion of the amount of the reinforcing fibers (A) is preferably 99 vol %. In a case where the proportion of the amount of the reinforcing fibers (A) to the total amount of the fibers is 99 vol % or less, it is possible to obtain a composite material which does not have a large fiber gap and is excellent in mechanical strength. The proportion of the amount of the reinforcing fibers (A) to the total amount of the reinforcing fibers is more preferably equal to or greater than 50 vol % and less than 99 vol %. An upper limit of the proportion of the amount of the reinforcing fibers (A) to the total amount of the reinforcing fibers is more preferably 95 vol % or less, and still more preferably 90 vol % or less.

As described above, since the reinforcing fibers (A) are bundles of reinforcing single fibers, it is also referred to as a reinforcing fiber bundle (A) for convenience in some cases. Similarly, the average number of single fibers of the reinforcing fibers (A) is abbreviated as an average fiber number in some cases.

(Thermoplastic Resin)

In the shaped product with grains and the fiber-reinforced resin material of the present invention, a thermoplastic resin is contained as a matrix resin. Further, in the present invention, a thermosetting resin may be used in combination as a matrix resin in a range of containing a thermoplastic resin as a main component.

The thermoplastic resin is not particularly limited, and those having a desired softening temperature can be appropriately selected and used depending on applications or the like of the shaped product with grains.

As the thermoplastic resin, those having a softening temperature in a range of 180° C. to 350° C. are usually used. However, the present invention is not limited thereto. In the present invention, the softening temperature of the thermoplastic resin is a crystal melting temperature, that is, a so-called melting point for a crystalline thermoplastic resin, and a glass transition temperature for an amorphous thermoplastic resin.

Examples of the thermoplastic resin can include one or more selected from the group consisting of polyolefin resins, polystyrene resins, thermoplastic polyamide resins, polyester resins, polyacetal resins (polyoxymethylene resins), polycarbonate resins, (meth)acrylic resins, polyarylate resins, polyphenylene ether resins, polyimide resins, polyether nitrile resins, phenoxy resins, polyphenylene sulfide resins, polysulfone resins, polyketone resins, polyether ketone resins, thermoplastic urethane resins, fluorine-based resins, thermoplastic polybenzimidazole resins, and the like.

Examples of the polyolefin resin can include one or more selected from the group consisting of polyethylene resin, polypropylene resin, polybutadiene resin, polymethylpentene resin, vinyl chloride resin, vinylidene chloride resin, vinyl acetate resin, polyvinyl alcohol resin, and the like.

Examples of the polystyrene resin can include one or more selected from the group consisting of polystyrene resin, acrylonitrile-styrene resin (AS resin), acrylonitrile-butadiene-styrene resin (ABS resin), and the like.

Examples of the polyamide resin can include one or more selected from the group consisting of polyamide 6 resin (nylon 6), polyamide 11 resin (nylon 11), polyamide 12 resin (nylon 12), polyamide 46 resin (nylon 46), polyamide 66 resin (nylon 66), polyamide 610 resin (nylon 610), and the like.

Examples of the polyester resin can include polyethylene terephthalate resin, polyethylene naphthalate resin, polybutylene terephthalate resin, polytrimethylene terephthalate resin, and liquid crystal polyester.

Examples of the (meth)acrylic resin can include polymethyl methacrylate.

Examples of the modified polyphenylene ether resin can include modified polyphenylene ether.

Examples of the thermoplastic polyimide resin can include thermoplastic polyimide, polyamideimide resin, and polyetherimide resin.

Examples of the polysulfone resin can include one or more selected from the group consisting of modified polysulfone resin, polyethersulfone resin, and the like.

Examples of the polyether ketone resin can include one or more selected from the group consisting of polyether ketone resin, polyether ether ketone resin, and polyether ketone ketone resin.

Examples of the fluorine-based resin can include polytetrafluoroethylene.

The thermoplastic resin used in the present invention may be of only one type, or may be of two or more types. As a mode in which two or more types of thermoplastic resins are used in combination, for example, a mode in which thermoplastic resins having mutually different softening temperatures are used in combination or a mode in which thermoplastic resins having mutually different average molecular weights are used in combination. However, the present invention is not limited thereto.

(Production Method for Fiber-Reinforced Resin Material)

The fiber-reinforced resin material used in the present invention can be produced by a method known in the related art.

In a case where the thermoplastic resin is used as a matrix resin, for example, production can be performed according to, but not limited thereto, the following steps: 1. Step of cutting reinforcing fibers, 2. step of opening the cut reinforcing fibers, and 3. step of mixing the opened reinforcing fibers and a fibrous or particulate matrix resin to become an isotropic base material, and then heating and compressing the isotropic base material so that impregnation of the thermoplastic resin proceeds, to obtain a fiber-reinforced resin material.

As the isotropic base material, an in-plane isotropic base material (also referred to as a two-dimensional random orientated mat) is preferable, and the production method therefor is described in detail in the specifications of Pamphlet of International Publication No. WO2012/105080 and JP-A-2013-49298.

That is, it is possible to obtain a mat by, as necessary, continuously slitting a strand made of a plurality of reinforcing fibers along a length direction of the reinforcing fibers into a plurality of narrow strands of 0.05 mm to 5 mm, then continuously cutting them into an average fiber length of 3 mm to 100 mm, and, in a state of being opened to reinforcing fibers of a smaller single fiber number by spraying gas to the cut reinforcing fibers, performing deposition in a layered manner on a breathable conveyor net or the like. At this time, it is also possible to make production by a method for producing an isotropic base material containing a thermoplastic resin, including depositing a granular or short fibrous thermoplastic resin together with reinforcing fibers on a breathable conveyor net, or supplying a melted thermoplastic resin in the form of a film to a mat-shape reinforcing fiber layer so that the melted thermoplastic resin is permeated thereinto.

In order to control the number of single fibers in the reinforcing fibers (A), in the above-described method for producing a suitable isotropic base material, the control can be achieved by adjusting a size of the reinforcing fibers to be subjected to the cutting step, for example, a width of the reinforcing fibers as a bundle of single fibers and the number of single fibers per width. Specific examples thereof include widening a width of the reinforcing fibers by widening or the like and subjecting it to the cutting step, and a method of providing a slitting step before the cutting step. Alternatively, the reinforcing fibers may be slit simultaneously with cutting.

For the fiber-reinforced resin material using the isotropic base material as described above, in an in-plane thereof, the reinforcing fibers are not oriented in a specific direction, but are dispersedly disposed in a random direction. That is, such fiber-reinforced resin material is an in-plane isotropic material. An in-plane isotropy of the fiber-reinforced resin material can be quantitatively evaluated by determining a ratio of the tensile moduli in two directions orthogonal to each other.

Further, the shaped product with grains or the fiber-reinforced resin material of the present invention may contain additives such as various non-fibrous or fibrous fillers of organic fiber or inorganic fiber, a flame retardant, a UV-resistant agent, a stabilizing agent, a release agent, carbon black, a pigment, a dye, a softening agent, a plasticizer, and a surfactant, to the extent that an object of the present invention is not impaired.

In the shaped product with grains, in a case where an L value indicating a brightness of a color is less than 80, the reinforcing fibers contained therein are hardly visible and the entire appearance looks uniform, which is preferable; and the L value is more preferably less than 60, and still more preferably less than 40. A lower limit of the L value of the shaped product with grains is not particularly limited, and it is, by definition, 0 or more, preferably 5 or more, and more preferably 10 or more. The above L value is preferably a value based on JIS Z 8730: 1980.

EXAMPLES

The following examples are illustrated, but the present invention is not limited thereto. The respective values in the present examples were obtained according to the following methods. Tables 1 to 3 show a design of grains, processing conditions of a mold, a mold temperature at the time of molding, and an obtained shaped product in each of the examples and comparative examples.

1) Volume Fraction (Vf) of Reinforcing Fibers in Fiber-Reinforced Resin Material A fiber-reinforced resin material was burned at 500° C. for 1 hour in a furnace to remove a matrix resin, and a content of reinforcing fibers and a mass of the matrix resin were calculated by weighing a mass of a specimen before and after the treatment. Next, volumes of the reinforcing fibers and the matrix resin were calculated using a specific gravity of each of the components, and a volume fraction of reinforcing fibers (Vf) in the fiber-reinforced resin material was calculated according to Expression (u).

$$Vf=100\times(\text{reinforcing fiber volume})/((\text{reinforcing fiber volume})+(\text{thermoplastic resin volume})) \quad (u)$$

2) Critical Single Fiber Number of Fiber-reinforced Resin Material, Proportion of Amount of Reinforcing Fibers (A) in Total Amount of Reinforcing Fibers, and Reinforcing Fiber Length Measurements were performed according to the method described in Pamphlet of International Publication No. WO2012/105080, or the method described in US Patent Application Publication No. 2014/0186584.

3) Maximum Height (Rz) of Grains

A surface of a shaped product with grains was measured using a shape measuring laser microscope (VK-X100) manufactured by Keyence Corporation with 9 fields of view at a measurement magnification of 10 times, and the maximum height (Rz) of the grains was calculated according to JIS B 0601: 2001. A cutoff wavelength for calculation was 0.25 μm.

4) Average Pitch (Rsm) between Adjacent Grains

A surface of a shaped product with grains was measured using a shape measuring laser microscope (VK-X100) manufactured by Keyence Corporation with 9 fields of view at a measurement magnification of 10 times, and the average pitch (Rsm) between the grains was calculated according to JIS B 0601: 2001. A cutoff wavelength for calculation is 0.25 µm.

5) Spraying Treatment of Spherical Particles

A mold surface was etched to form a desired grained shape on the mold surface, and then a washing and drying was performed, and a spraying and polishing was performed using sand for sandblasting #100, to prepare a mold having a grained shape. The above spraying treatment is described as a half gloss.

A mold surface was etched to form a desired grained shape on the mold surface, then a washing and drying was performed, and a spraying and polishing was performed using sand for sandblasting #20, and then a spraying and polishing was performed using glass beads for sandblasting having a particle diameter of 90 to 125 µm, to prepare a mold having a grained shape. The above spraying treatment is described as a total gloss.

HPM7, manufactured by Hitachi Metals Tool Steel Co., Ltd., was used as a steel material of the mold.

6) Plating Film Thickness

A mold having a grained shape was subjected to a plating treatment by immersing it in a bath for plating hard chromium, and a plating film was provided on a mold surface including also a grained shape part on a molding surface thereof. A thickness of the plating film was measured using a digital micrometer with a test piece of the same type of steel material which had been plated under the same conditions as the mold having a grained shape.

7) Mold Temperature

A medium-return temperature of a mold temperature controller used for molding during pressing was described as a mold temperature.

8) Appearance of Shaped Product with Grains, Appearance at 10th Shot, and Appearance at 1000th Shot Although it can be said that an appearance of the shaped product with grains of the present invention has a suppressed difference from a grained sample, the difference will be explained.

Figure 4:
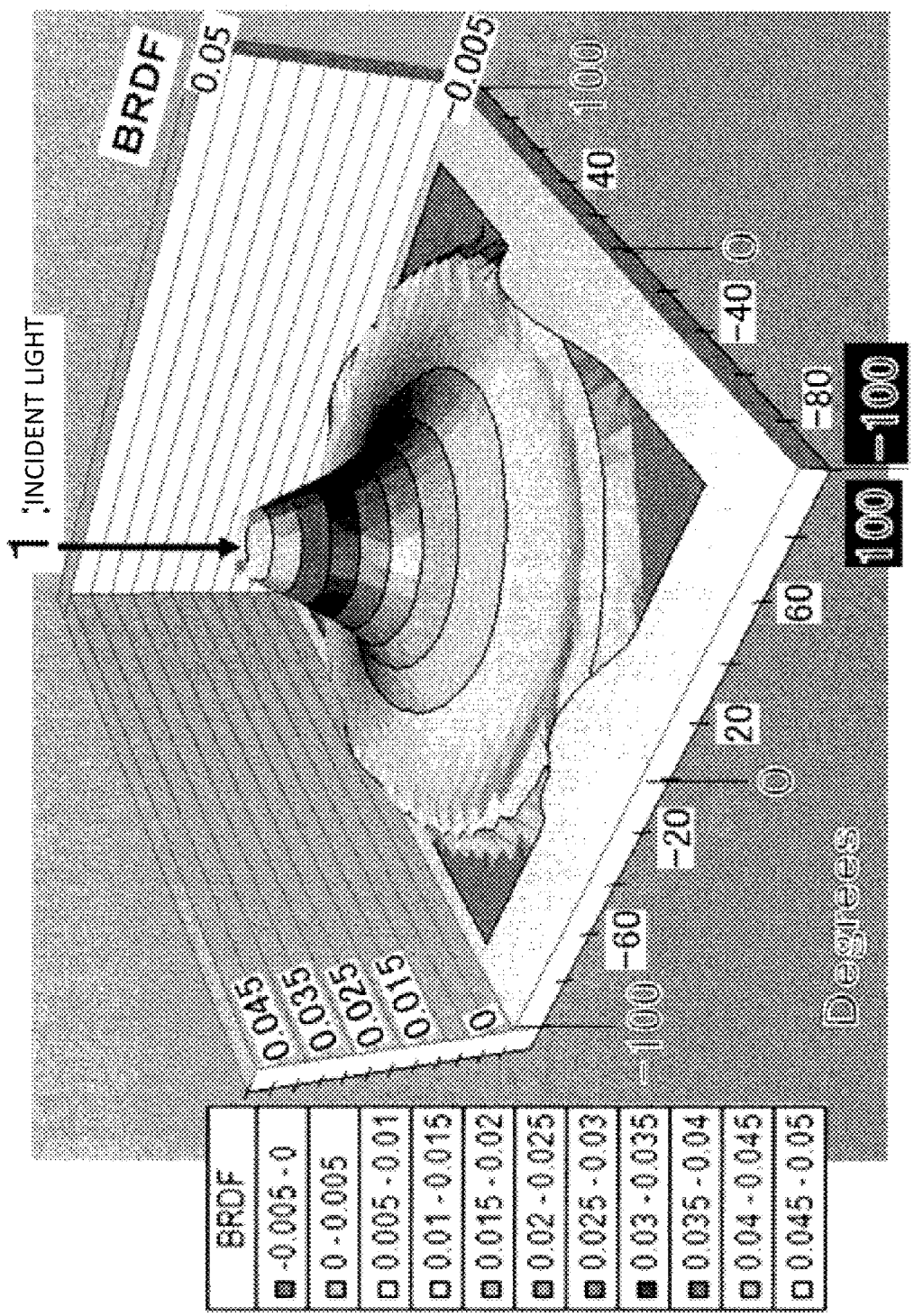
FIG. 4 shows a measurement result of reflection-scattered light (scattering and appearance measurement system IS-SA manufactured by Radiant Zemax LLC.) of the shaped product with grains of Example 1.

As described above, a surface of the shaped product with grains changes depending on smoothness of a mold surface having a grained shape used. In a case where polishing irregularity remains on a surface of the mold, the polishing irregularity is filled with a fiber-reinforced resin material by molding, and the fiber-reinforced resin shaped product imparted with the grained shape is subjected to undercutting at the time of being released from the mold. Thus, fine deformation, tearing, or peeling occurs on a surface of the shaped product, and directional scattering occurs on the grained shape surface in a case where light hits the same, which leads to increase in maximum reflectance and decrease in half-value width, the maximum reflectance and the half-value width being described later. As a result, it appears that whitening has occurred depending on an angle of view, and this is recognized as a large difference in appearance from the grained sample, which results in poor appearance. For Comparative Example 1 shown in Table 1, which was determined to be poor in appearance due to occurrence of whitening, an appearance photograph thereof is shown in FIG. 1, reflection scattering light measurement results therefor are shown in FIG. 3, and observation results with SEM (S-3400 manufactured by Hitachi, Ltd., measurement voltage of 10 kV) are shown in FIG. 5; and for Example 1 shown in Table 1, which was determined to be uniform and good in appearance due to no occurrence of whitening, an appearance photograph thereof is shown in FIG. 2, reflection scattering light measurement results therefor are shown in FIG. 4, and observation results with SEM are shown in FIG. 6.

Figure 1B:
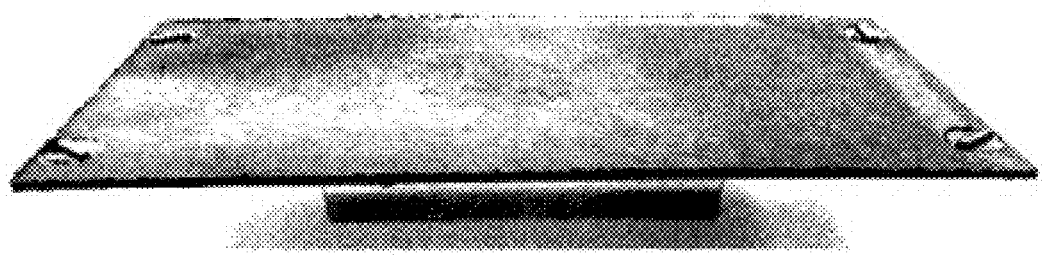
Figure 5:
FIG. 5 is an SEM image (magnification of 300 times) of the shaped product with grains of Comparative Example 1.
Figure 6:
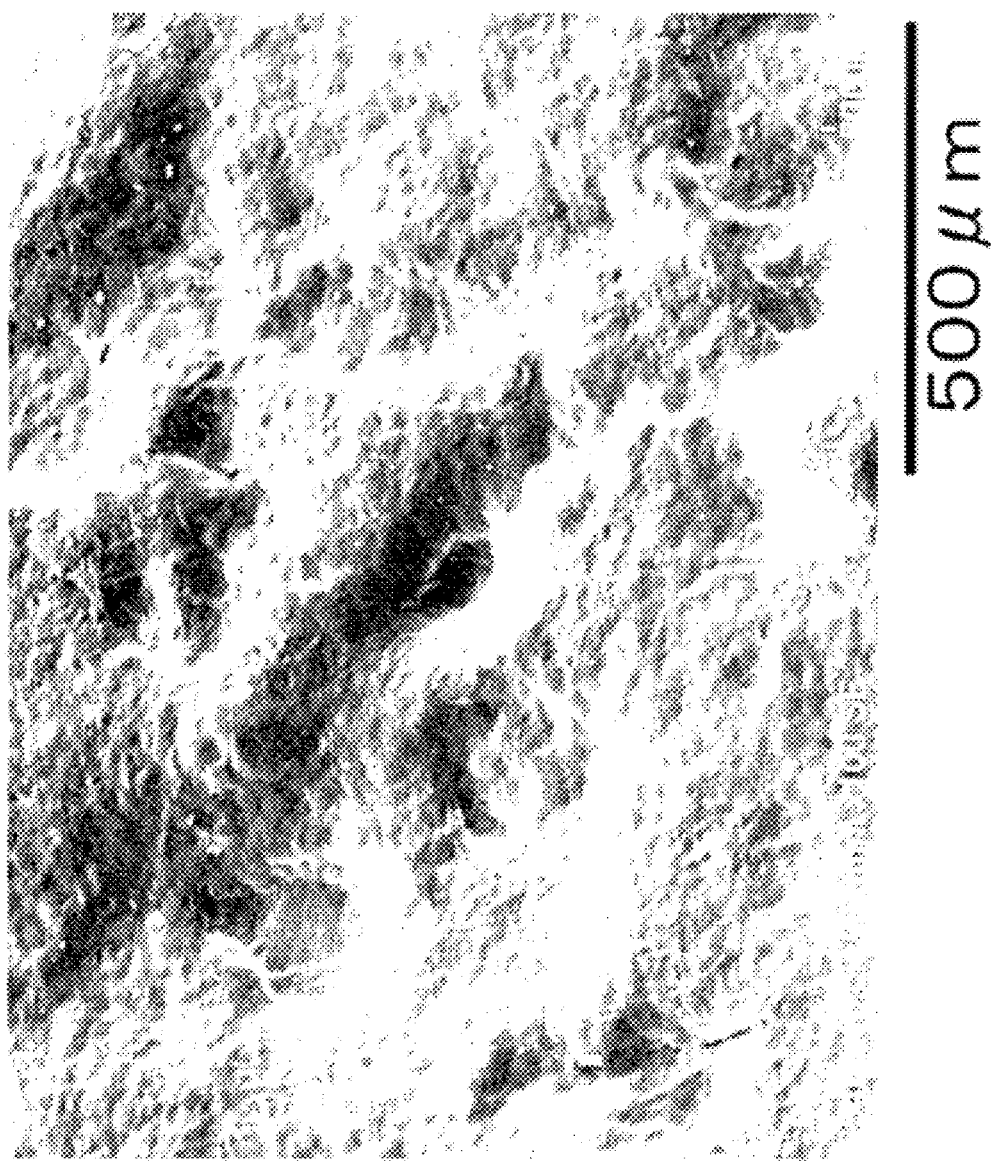
FIG. 6 is an SEM image (magnification of 300 times) of the shaped product with grains of Example 1.

In Comparative Example 1 having an appearance with whitening in FIG. 1, as shown in FIG. 3, a strong reflection scattering near a horizontal plane, that is, directional scattering occurring on the grained shape surface is observed, and as shown in FIG. 5, it has a rough surface. On the other hand, in Example 1 having a uniform and good appearance in FIG. 2, as shown in FIG. 4, there is no directional scattering and weak reflection scattered light is exhibited excluding an incident direction, and as shown in FIG. 6, it has a smooth surface.

With respect to evaluation of the shaped product with grains, an appearance after 10 shots means that a shaped product with grains at 10th shot obtained by 10-shot molding under molding conditions as described later is visually observed while changing an angle of view, and is evaluated as good in a case where whitening is not observed, and as poor in a case where whitening is observed.

Likewise, an appearance after 1,000 shots means that a shaped product with grains at 1000th shot obtained by 1000-shot molding under molding conditions as described later is visually observed while changing an angle of view, and is evaluated as good in a case where whitening is not observed, and as poor in a case where whitening is observed.

9) Measurement Values of Maximum Reflectance, Half-Value Width, and Maximum Reflectance/Half-Value Width Measurement of reflection scattered light as described above requires measurement time and complicated operation. Thus, the present inventors have found that goniophotometric measurement using a goniophotometer is suitable from the viewpoints that it is possible to detect a difference between a good appearance and an appearance with whitening, and measurement is made simple. With respect to shaped products with grains obtained in the present examples and the comparative examples, goniophotometric measurement was performed using BC-5000L goniophotometer, manufactured by Nippon Denshoku Industries Co., LTD, at an incident angle of 135° and a detection angle of 0° to 85°. The measurement results of Comparative Example 1, which was determined to be poor in appearance due to occurrence of whitening, are shown in FIG. 7, the measurement results of Example 1, which was determined to be uniform and good in appearance due to no occurrence of whitening, are shown in FIG. 8, and an outline for goniophotometric measurement is shown in FIG. 9.

Figure 7:
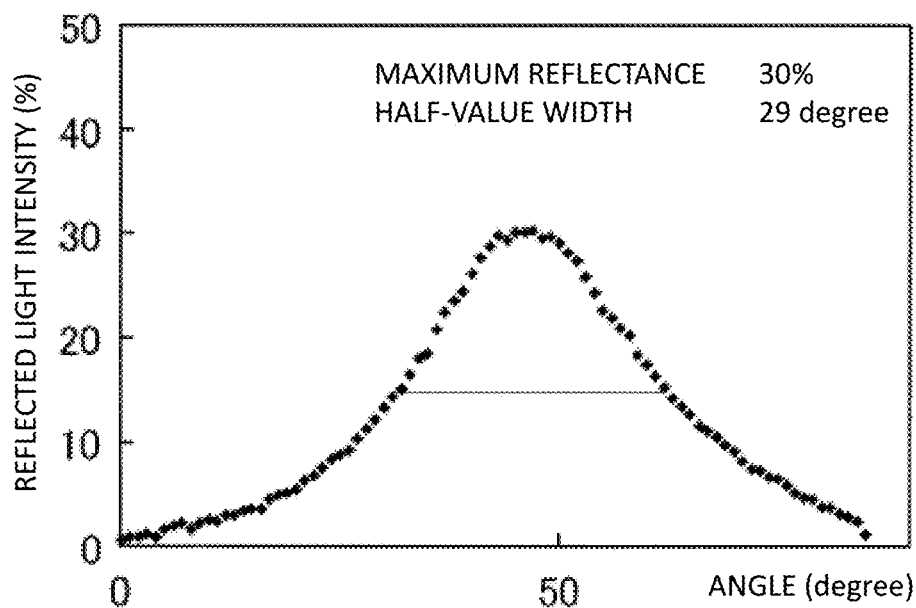
FIG. 7 is a measurement result (BC-5000L, manufactured by Nippon Denshoku Industries Co., LTD, incident angle of 135°) of the shaped product with grains of Comparative Example 1 using a goniophotometer. The maximum reflectance R was 30%, and the half-value width H was 29°.
Figure 8:
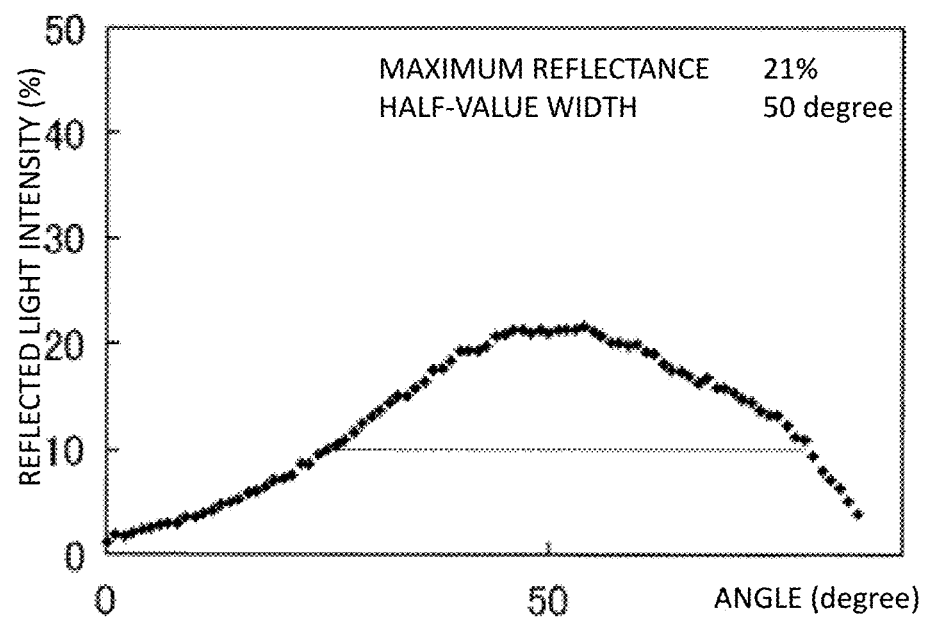
FIG. 8 is a measurement result (BC-5000L, manufactured by Nippon Denshoku Industries Co., LTD, incident angle of 135°) of the shaped product with grains of Example 1 using a goniophotometer. The maximum reflectance R was 21%, and the half-value width H was 50°.
Figure 9:
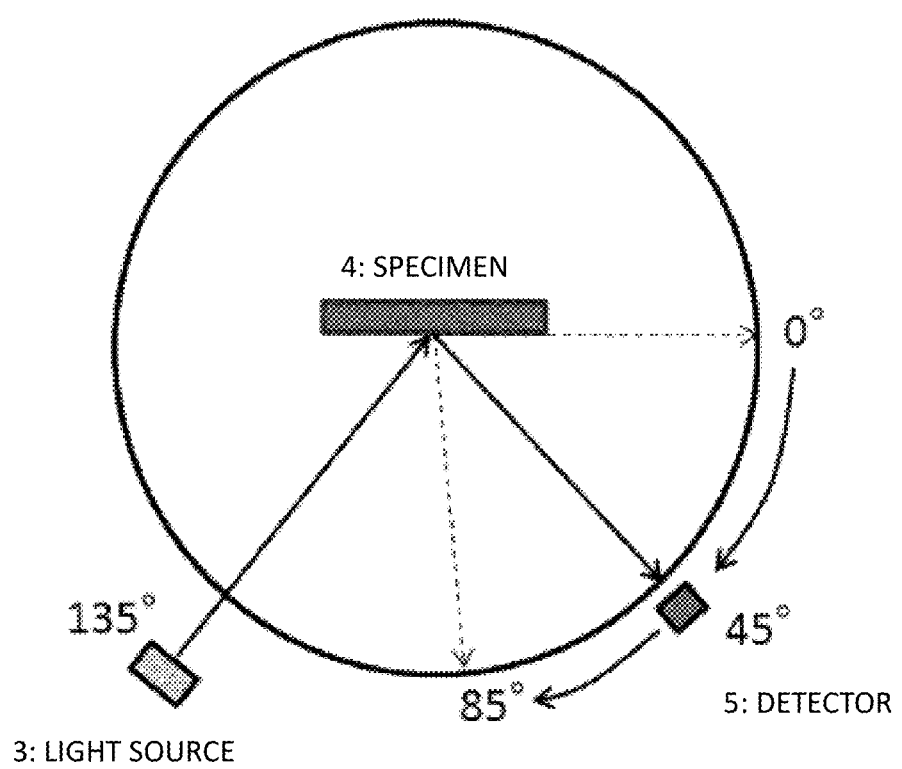
FIG. 9 is a measurement conceptual diagram of a goniophotometer.

The maximum reflectance is a maximum value of the reflectances as shown in FIG. 7 or FIG. 8. In addition, for a reflectance that is half the maximum reflectance, there are two points in total, each point being present at the left or right of the maximum reflectance. The half-value width is a difference between the two points, and a unit of the half-value width is degree which is a unit of angle. A ratio of the maximum reflectance to the half-value width is the maximum reflectance/half-value width. In a case where the maximum reflectance/half-value width is large, a sharp peak is exhibited, and in a case where the maximum reflectance/half-value width is small, a gentle peak is exhibited. The measurement results of the maximum reflectance/half-value width in the respective examples and comparative examples are shown in the respective tables as measurement values of the maximum reflectance/half-value width.

As can be seen from these drawings, Comparative Example 1, which was determined to be poor in appearance due to occurrence of whitening, exhibits a large maximum reflectance and a sharp peak, and Example 1, which was determined to be uniform and good in appearance due to no occurrence of whitening, exhibits a small maximum reflectance and a gentle peak.

10) Threshold Value for Maximum Reflectance/Half-Value Width

A threshold value for the maximum reflectance/half-value width is calculated by putting the maximum reflectance obtained by a goniophotometric measurement into a right side of Expression (1).

$$R/H \leq 0.034 \times R - 0.15 \quad (1)$$

In the expression, R is a maximum reflectance (%), and H is a half-value width (degree).

11) Determination of Maximum Reflectance/Half-Value Width

The maximum reflectance/half-value width was determined according to the following criteria.

Pass: Measurement value of maximum reflectance/half-value width≤threshold value of maximum reflectance/half-value width Failure: Measurement value of maximum reflectance/half-value width>threshold value of maximum reflectance/half-value width 12) SEM Observation Results Using S-3400 manufactured by Hitachi Ltd., a surface of a shaped product with grains was observed at a measurement voltage of 10 kV and a measurement magnification of 300 times.

13) Warpage of Shaped Product

One side of a shaped product with grains was fixed on a flat plate, and a height thereof being furthest away from the flat plate was measured using a ruler.

(Production of Fiber-Reinforced Resin Material)

Production Example 1

Using, as reinforcing fibers, PAN-based carbon fibers "Tenax" (registered trademark) STS40-24KS (average of diameters of single fibers of 7 μm, single fiber number of 24,000) manufactured by TOHO TENAX Co., Ltd., which was treated with a nylon sizing agent, and as a matrix resin, nylon 6 resin A1030 (melting point of 225° C., glass transition temperature of 47° C.) manufactured by Unitika Ltd., based on the method described in Pamphlet of International Publication No. WO2012/105080, an isotropic base material was prepared, which has carbon fiber areal weight of 1,441 g/m² and nylon 6 resin areal weight of 1,704 g/m² and in which the carbon fibers having a weight average fiber length of 20 mm in an in-plane isotropic manner are two-dimensionally randomly oriented.

The obtained isotropic base material was heated at 2.0 MPa for 5 minutes in a press machine heated to 260° C. by using a mold having a concave portion at the top. Then, a fiber-reinforced resin material having a thickness of 2.3 mm and a volume fraction of reinforcing fibers (Vf) of 35% was obtained. The reinforcing fibers were two-dimensionally randomly oriented in the fiber-reinforced resin material.

In the reinforcing fibers contained in the fiber-reinforced resin material, a weight average fiber length thereof is 20 mm and a critical single fiber number thereof is 86, and a proportion of reinforcing fibers (A), that are composed of carbon single fibers of which the number is equal to and greater than a critical single fiber number, in a total amount of the reinforcing fibers was 85 vol %. In the fiber-reinforced resin material, as reinforcing fibers other than the reinforcing fibers (A), there were also bundles composed of carbon single fibers of which the number is less than the critical single fiber number, and carbon fibers in a shape of single fibers.

Production Example 2

Based on the description of US Patent Application Publication No. 2015/0191583, a fiber-reinforced resin material was obtained as follows.

Through a solution obtained by using 2-hexyldecyl p-hydroxybenzoate (EXCEPARL HD-PB manufactured by Kao Corporation) as an impregnation aid and emulsifying the same to a nonvolatile content of 12% by weight, PAN-based carbon fiber strands (equivalent to STS40 24K manufactured by Toho Tenax Co., Ltd., single fiber diameter of 7.0 μm, single fiber number of 24,000, tensile strength of 4,000 MPa) as carbon fibers were passed, and then the solution excessively adhered to the carbon fibers was removed with a nip roll. Furthermore, the carbon fibers to which the impregnation aid was adhered were passed through a hot air drying oven heated to 180° C. for 2 minutes and dried, thereby obtaining easily-impregnated carbon fibers. Such easily-impregnated carbon fibers were placed along two metallic rolls heated to 200° C. and having a diameter of 60 mm, and subjected to a heat treatment again to obtain easily-impregnated carbon fibers in which the impregnation aid was more uniformly adhered to the carbon fibers. The content of the impregnation aid in such easily-impregnated carbon fibers is 6% by weight (6.4 parts by weight per 100 parts by weight of carbon fibers).

Next, the easily-impregnated carbon fibers obtained above were coated with nylon 6 resin A1030 manufactured by Unitika Co., Ltd. using a crosshead die for electric wire coating having an outlet diameter of 3 mm, and this was cut into 6 mm length to obtain a molding material which is a core-sheath type pellet suitable for injection molding, and having a carbon fiber content of 30% by mass (221 parts by mass of nylon 6 per 100 parts by mass of carbon fiber), a diameter of 3.2 mm, and a length of 6 mm. Such molding material was injection-molded using a 110 ton electric injection molding machine (J110AD; manufactured by The Japan Steel Works Ltd.) in a molding cycle of 35 seconds at cylinder temperatures of C1/C2/C3/C4/N=280° C./290° C./290° C./290° C./280° C. (C1 to C4 are cavities and N is a nozzle), and a fiber-reinforced resin material having 200× 200 mm×thickness of 2.3 mm and a volume fraction of reinforcing fibers (Vf) of 21.4% was obtained for production of a shaped product with grains.

Production Example 3

Through a solution obtained by using bisphenol A bis (diphenyl phosphate) (manufactured by Daihachi Chemical Co., Ltd.; CR-741), which is an aromatic condensed phosphoric acid ester, as an impregnation aid and emulsifying the same to a nonvolatile content of 12% by mass, PAN-based carbon fiber filaments (equivalent to STS40 24K manufactured by Toho Tenax Co., Ltd., single fiber diameter of 7.0 μm, single fiber number of 24,000, tensile strength of 4,000 MPa) as a carbon fiber bundle were passed, the excessively adhered solution was removed with a nip roll, and then drying was performed by passing the resulting product through a hot air drying oven heated to 180° C. over 2 minutes. The easily-impregnated carbon fibers obtained by the above treatment were placed along two metallic rolls heated to 200° C. and having a diameter of 60 mm, and subjected to a heat treatment again to obtain impregnatable carbon fibers in which the impregnation aid was more uniformly adhered to the carbon fiber bundle. The content of the impregnation aid for such easily impregnatable carbon fiber bundle is 5 mass % (5.3 parts by mass per 100 parts by mass of carbon fibers).

Next, the easily-impregnatable carbon fiber bundle obtained above was coated with polycarbonate (L-1225Y manufactured by Teijin Kasei Co., Ltd.) using a crosshead die for electric wire coating having an outlet diameter of 3 mm, and this was cut into 6 mm length to obtain a molding material which is a core-sheath type pellet suitable for injection molding, and having a carbon fiber content of 20% by mass (394.7 parts by mass of polycarbonate per 100 parts by mass of carbon fibers), a diameter of 3.2 mm, and a length of 6 mm in length. Such molding material was injection-molded using a 110 ton (1079 kN) electric injection molding machine (J110AD; manufactured by The Japan Steel Works Ltd.) in a molding cycle of 35 seconds at cylinder temperatures of C1/C2/C3/C4/N=280° C./290° C./290° C./290° C./290° C. (C1 to C4 are cavities and N is a nozzle), and a fiber-reinforced resin material having 200×200 mm×thickness of 2.3 mm and a volume fraction of reinforcing fibers (Vf) of 14.4% was obtained for production of a shaped product with grains.

Example 1

A shaped product with grains was produced by the procedures the above-described production method, with one prepared according to Production Example 1 as a fiber-reinforced resin material, and using a flat-plate mold having a grained pattern of TH-176B of TANAZAWA HAKKOSHA Co., Ltd., a depth of a grain of 40 μm, and a draft angle of 4°. A spraying treatment of the spherical particles is half-gloss, a thickness of a plating treatment is 10 μm, a temperature of the mold is 150° C., and other details are as described above and in Table 1. A state of the reinforcing fibers such as an areal weight of the reinforcing fibers, a weight average fiber length thereof, a proportion of the amount of the reinforcing fibers (A), and a two-dimensional random orientation property, in the fiber-reinforced resin material, was also substantially maintained in the shaped product with grains.

Further, the results of Rz and Rsm of the shaped product with grains obtained by observation using a shape measuring laser microscope (VK-X 100) manufactured by Keyence Corporation at a measurement magnification of 10 times are shown in Table 1.

A shaped product with grains was obtained, in which an appearance of the obtained shaped product with grains was good both at the 10th shot and at the 1000th shot, a maximum reflectance/half-value width thereof was determined to be pass, a surface of the shaped product with grains was smooth as viewed by the SEM, the appearance thereof was uniform and good with small warpage, and dimensions thereof were excellent. The L value (JIS Z 8730: 1980) showing a brightness of this shaped product with grains was 28. L values of the shaped products with grains obtained in the following examples were also the same.

Comparative Example 1

Production and evaluation of a shaped product with grains were performed in the same manner as in Example 1, except that the mold was not subjected to a plating treatment. A state of the reinforcing fibers such as an areal weight of the reinforcing fibers, a weight average fiber length thereof, a proportion of the amount of the reinforcing fibers (A), and a two-dimensional random orientation property, in the fiber-reinforced resin material, was also substantially maintained in the shaped product with grains, and the results of Rz and Rsm of the shaped product with grains are shown in Table 1.

An appearance of the obtained shaped product with grains was poor at the 10th shot, and an appearance test of 1000 shots was not performed. A maximum reflectance/half-value width was determined to be failure, a surface of the shaped product with grains was rough as viewed by the SEM and warpage was small, while whitening occurred in the obtained shaped product with grains.

Examples 2 to 8, and Comparative Examples 2 to 6

In Examples 2 to 8 and Comparative Examples 2 to 6, shaped products with grains were produced and evaluated in the same manner as in Example 1 except that some conditions were changed as described in Tables 1 to 3. In examples other than Examples 9 to 10 in which the reinforcing fibers were broken during molding due to injection molding, a state of the reinforcing fibers such as an areal weight of the reinforcing fibers, a weight average fiber length thereof, a proportion of the amount of the reinforcing fibers (A), and a two-dimensional random orientation property, in the fiber-reinforced resin material, was also substantially maintained in the shaped product with grains, and the results of Rz and Rsm of the shaped product with grains are shown in Table 1.

In Example 2, a thickness due to the plating treatment was as thin as 3 μm and an appearance of the 1000th shot was poor, but an appearance of the 10th shot was good. In Examples 3 to 8, shaped products with grains were obtained, in which at both the 10th shot and the 1000th shot, good appearance was exhibited, an appearance thereof was uniform and good with small warpage, and dimensions thereof were excellent.

In Comparative Examples 2 to 4 and 6, since the maximum reflectance/half-value width was determined to be failure, the appearance at the 10th shot was poor and the warpage was small, while whitening occurred in the obtained shaped product with grains.

In Comparative Example 5, due to high temperature of the mold, deformation at release occurred and it was impossible to perform measurements.

Example 9

Using the fiber-reinforced resin material of Production Example 2, a shaped product with grains was produced and evaluated in the same manner as in Example 1, except that some conditions were changed as shown in Table 2. Although warpage was large, a shaped product with grains was obtained, which was uniform and good in appearance.

Example 10

Using the fiber-reinforced resin material of Production Example 3, a shaped product with grains was produced in the same manner as in Example 1, except that some conditions were changed as shown in Table 2. Although warpage was large, a shaped product with grains was obtained, which was uniform and good in appearance.

INDUSTRIAL APPLICABILITY

A fiber-reinforced resin shaped product having grains on at least a part of a surface thereof the present invention and a method for producing the same can be used for various applications such as automobile application, aircraft application, and OA application.

While the present invention has been described in detail and with reference to specific embodiments, it will be apparent to those skilled in the art that various changes and modifications can be made without departing from the spirit and scope of the present invention.

This application is based on Japanese Patent Application (Japanese Patent Application No. 2016-001825) filed on Jan. 7, 2016, the entire contents of which are incorporated herein by reference.

REFERENCE SIGNS LIST

1: incident light
2: directional scattering (region where the same occurs)
3: light source
4: specimen
5: detector

TABLE 1

| | | | Example 1 | Example 2 | Example 3 | Comparative Example 1 | Comparative Example 2 | Comparative Example 3 | Comparative Example 4 |
|---|---|---|---|---|---|---|---|---|---|
| | Fiber-reinforced resin material | | Production Example 1 | Production Example 1 | Production Example 1 | Production Example 1 | Production Example 1 | Production Example 1 | Production Example 1 |
| Design of grains | Grained pattern | — | TH176B | TH176B | TH176B | TH176B | TH176B | TH1008 | TH176B |
| | Depth of grains | μm | 40 | 40 | 40 | 40 | 100 | 100 | 40 |
| | Draft angle | ° | 4 | 4 | 4 | 4 | 10 | 10 | 4 |
| Mold | Spraying treatment with spherical particles | — | Half gloss | Half gloss | Half gloss | Half gloss | Half gloss | Half gloss | Total gloss |
| | Thickness of plating treatment | μm | 10 | 3 | 20 | Nonee | None | None | None |
| | Mold temperature | ° C. | 150 | 150 | 150 | 150 | 150 | 150 | 150 |
| Shaped Product | Weight average fiber length of reinforcing fibers | mm | 20 | 20 | 20 | 20 | 20 | 20 | 20 |
| | Maximum height of grains (Rz) | μm | 127 | 118 | 141 | 106 | 135 | 110 | 111 |
| | Average pitch between grains (Rsm) | μm | 698 | 703 | 652 | 716 | 482 | 778 | 704 |
| Evaluation of shaped product | Appearance at $10^{th}$ shot | Visual observation | Good | Good | Good | Poor | Poor | Poor | Poor |
| | Maximum reflectance | % | 21 | 22 | 20 | 30 | 24 | 11 | 44 |
| | Measurement value of maximum reflectance/half-value width | — | 0.42 | 0.54 | 0.34 | 1.03 | 0.70 | 0.23 | 1.37 |
| | Threshold value of maximum reflectance/half-value width | — | 0.56 | 0.60 | 0.53 | 0.87 | 0.67 | 0.22 | 1.35 |
| | Determination of maximum reflectance/half-value width | — | Pass | Pass | Pass | Failure | Failure | Failure | Failure |
| | Appearance at $1,000^{th}$ shot | Visual observation | Good | Poor | Good | | | | |
| | Observation result with SEM | — | Smooth | | | Rough | | | |
| | Warpage | mm | 2.4 | 2.5 | 1.8 | 2.6 | 2.2 | 2.6 | 2.5 |

TABLE 2

| | | | Example 4 | Example 5 | Example 6 | Example 7 | Example 8 | Example 9 | Example 10 |
|---|---|---|---|---|---|---|---|---|---|
| | Fiber-reinforced resin material | | Production Example 1 | Production Example 1 | Production Example 1 | Production Example 1 | Production Example 1 | Production Example 2 | Production Example 3 |
| Design of grains | Grained pattern | — | TH1008 | TH1008 | TH1008 | TH1008 | TH1008 | TH1008 | TH1008 |
| | Depth of grains | μm | 40 | 100 | 100 | 100 | 100 | 100 | 100 |
| | Draft angle | ° | 4 | 10 | 10 | 10 | 10 | 10 | 10 |
| Mold | Spraying treatment with spherical particles | — | Total gloss | Total gloss | Total gloss | Total gloss | Half gloss | Total gloss | Total gloss |
| | Thickness of plating treatment | μm | None | None | None | None | 10 | None | None |
| | Mold temperature | ° C. | 150 | 150 | 130 | 60 | 150 | 150 | 150 |
| Shaped product | Weight average fiber length of reinforcing fibers | mm | 20 | 20 | 20 | 20 | 20 | 0.9 | 0.5 |
| | Maximum height of grains (Rz) | μm | 87 | 115 | 121 | 101 | 136 | 117 | 139 |
| | Average pitch between grains (Rsm) | μm | 1328 | 745 | 734 | 841 | 719 | 744 | 694 |
| Evaluation of shaped product | Appearance at $10^{th}$ shot | Visual observation | Good | Good | Good | Good | Good | Good | Good |

TABLE 2-continued

|  |  | Example 4 | Example 5 | Example 6 | Example 7 | Example 8 | Example 9 | Example 10 |
|---|---|---|---|---|---|---|---|---|
| Maximum reflectance | % | 28 | 26 | 29 | 24 | 33 | 32 | 30 |
| Measurement value of maximum reflectance/half-value width | — | 0.73 | 0.69 | 0.72 | 0.65 | 0.85 | 0.74 | 0.72 |
| Threshold value of maximum reflectance/half-value width | — | 0.80 | 0.73 | 0.84 | 0.67 | 0.97 | 0.94 | 0.87 |
| Determination of maximum reflectance/half-value width | — | Pass | Pass | Pass | Pass | Pass | Pass | Pass |
| Appearance at 1,000$^{th}$ shot | Visual observation | Good | Good | Good | Good | Good | Good | Good |
| Warpage | mm | 2.6 | 2.4 | 2.3 | 2.7 | 2.2 | 16.2 | 4.6 |

TABLE 3

|  |  |  | Example 11 | Comparative Example 5 | Comparative Example 6 |
|---|---|---|---|---|---|
| Fiber-reinforced resin material |  |  | Production Example 1 | Production Example 1 | Production Example 1 |
| Design of grains | Grained pattern | — | T-1709 | TH1008 | TH1008 |
|  | Depth of grains | μm | 70 | 100 | 100 |
|  | Draft angle | ° | 8 | 10 | 10 |
| Mold | Spraying treatment with spherical particles | — | Total gloss | Total gloss | Half gloss |
|  | Thickness of plating treatment | μm | None | None | None |
|  | Mold temperature | ° C. | 150 | 200 | 150 |
| Shaped product | Weight average fiber length of reinforcing fibers | mm | 20 | 20 | 20 |
|  | Maximum height of grains (Rz) | μm | 116 | Not measurable | 107 |
|  | Average pitch between grains (Rsm) | μm | 630 |  | 758 |
| Evaluation of shaped product | Appearance at 10$^{th}$ shot | Visual observation | Good | Not determinable due to deformation at release | Poor |
|  | Maximum reflectance | % | 27 |  | 10 |
|  | Measurement value of maximum reflectance/half-value width | — | 0.6 |  | 0.22 |
|  | Threshold value of maximum reflectance/half-value width | — | 0.77 |  | 0.19 |
|  | Determination of maximum reflectance/half-value width | — | Pass |  | Failure |
|  | Appearance at 1,000$^{th}$ shot | Visual observation | Good |  |  |
|  | Warpage | mm | 2.1 |  | 2.6 |

The invention claimed is:

1. A fiber-reinforced resin shaped product comprising reinforcing fibers and a thermoplastic resin and having grains on at least a part of a surface thereof,
   wherein a maximum height Rz of the grains is 0.1 μm to 1,000 μm, and
   a ratio of a maximum reflectance (R) to a half-value width (H), each of which is obtained by goniophotometric measurement at a surface location having the grains, satisfies Expression (1), $$R/H \leq 0.034 \times R - 0.15 \qquad (1)$$

in the Expression (1), R is a maximum reflectance (%), and H is a half-value width (degree).

2. The fiber-reinforced resin shaped product according to claim 1,
   wherein a weight average fiber length of the reinforcing fibers is in a range of 1 mm to 100 mm.

3. The fiber-reinforced resin shaped product according to claim 1,
   wherein the reinforcing fibers are a mixture of bundles of reinforcing single fibers, the bundles having different numbers of single fibers.

4. The fiber-reinforced resin shaped product according to claim 1,
   wherein a proportion of an amount of reinforcing fibers (A) that are bundles of critical single fiber number or more of single fibers with respect to a total amount of the reinforcing fibers is 20 vol % to 99 vol %, and the critical single fiber number is defined by the following Expression (2):

$$\text{Critical single fiber number} = 600/D \qquad (2)$$

in the Expression (2), D is an average of diameters of single fibers (μm) of the reinforcing fibers.

5. The fiber-reinforced resin shaped product according to claim 1,
   wherein the reinforcing fibers are one or more members selected from the group consisting of carbon fibers, glass fibers, aramid fibers, boron fibers, and basalt fibers.

6. The fiber-reinforced resin shaped product according to claim 1,
containing the thermoplastic resin in an amount of 3 parts by weight to 1,000 parts by weight, with respect to 100 parts by weight of the reinforcing fibers.

7. A method for producing the fiber-reinforced resin shaped product according to claim 1, comprising:
heating a fiber-reinforced resin material containing the reinforcing fibers and the thermoplastic resin into a plastic state;
disposing the fiber-reinforced resin material in a mold that is regulated to be in a temperature less than a plasticizing temperature of the fiber-reinforced resin material and has a grained shape on at least a part of a molding surface thereof; and
clamping the mold,
wherein a mold temperature at the time of clamping is higher by 10° C. or more than a glass transition temperature of the thermoplastic resin, and
wherein plating of the mold surface having the grained shape is performed to have a film thickness of the plating of 5 to 30 μm after the grained shape is formed on the molding surface of the mold by spraying and polishing with spherical particles.

\* \* \* \* \*